(12) United States Patent
Dahlstrand et al.

(10) Patent No.: US 10,676,688 B2
(45) Date of Patent: Jun. 9, 2020

(54) COMPOSITION COMPRISING DERIVATIZED LIGNIN FOR FUEL PRODUCTION

(71) Applicant: Ren Fuel K2B AB, Stockholm (SE)

(72) Inventors: Christian Dahlstrand, Uppsala (SE); Alexander Orebom, Uppsala (SE); Joseph Samec, Stockholm (SE); Supaporn Sawadjoon, Uppsala (SE); Joakim Löfstedt, Uppsala (SE)

(73) Assignee: REN FUEL K2B AB, Stockholm (SE)

( * ) Notice: Subject to any disclaimer, the term of this patent is extended or adjusted under 35 U.S.C. 154(b) by 0 days.

(21) Appl. No.: 15/575,318

(22) PCT Filed: Jun. 15, 2016

(86) PCT No.: PCT/SE2016/050584
§ 371 (c)(1),
(2) Date: Nov. 17, 2017

(87) PCT Pub. No.: WO2016/204682
PCT Pub. Date: Dec. 22, 2016

(65) Prior Publication Data
US 2018/0142177 A1 May 24, 2018

(30) Foreign Application Priority Data

Jun. 15, 2015 (SE) .................................. 1550813
May 3, 2016 (SE) .................................. 1650594

(51) Int. Cl.
*C07G 1/00* (2011.01)
*C10L 5/44* (2006.01)
(Continued)

(52) U.S. Cl.
CPC ................ *C10L 5/447* (2013.01); *C07G 1/00* (2013.01); *C08H 6/00* (2013.01); *C08L 97/005* (2013.01);
(Continued)

(58) Field of Classification Search
CPC .......... C07G 1/00; C08L 97/00; C08L 97/005
See application file for complete search history.

(56) References Cited

U.S. PATENT DOCUMENTS

| 2,429,102 A | 10/1947 | Lewis et al. |
| 4,420,644 A | 12/1983 | Huibers et al. |

(Continued)

FOREIGN PATENT DOCUMENTS

| SE | 1450071 A1 | 7/2014 |
| SE | 537732 C2 | 10/2015 |

(Continued)

OTHER PUBLICATIONS

Clark et al., "Esters of Certain Lignin Derivatives", Section of the Technical Association of the Pulp & Paper Industry, Paper Trade Journal, 1944, 119(6): 33-36.
(Continued)

*Primary Examiner* — Ellen M McAvoy
(74) *Attorney, Agent, or Firm* — James S. Keddie; Bozicevic, Field & Francis LLP

(57) ABSTRACT

The present invention relates to a composition comprising lignin and a solvent where the lignin is functionalized with an ether group.

21 Claims, 13 Drawing Sheets

(51) Int. Cl.
*C10G 1/08* (2006.01)
*C08L 97/00* (2006.01)
*C08H 7/00* (2011.01)
*C10G 3/00* (2006.01)
*C10L 1/18* (2006.01)
*C10L 1/14* (2006.01)
*C10L 1/188* (2006.01)
*C10L 1/19* (2006.01)
*C10L 1/16* (2006.01)

(52) U.S. Cl.
CPC ............... *C10G 1/083* (2013.01); *C10G 3/42* (2013.01); *C10G 3/50* (2013.01); *C10L 1/14* (2013.01); *C10L 1/1817* (2013.01); *C10G 2300/1014* (2013.01); *C10L 1/1616* (2013.01); *C10L 1/1881* (2013.01); *C10L 1/19* (2013.01); *Y02E 50/10* (2013.01); *Y02E 50/13* (2013.01); *Y02E 50/30* (2013.01); *Y02P 30/20* (2015.11)

(56) References Cited

U.S. PATENT DOCUMENTS

| | | | |
|---|---|---|---|
| 4,739,041 A | 4/1988 | Morrow et al. | |
| 5,094,295 A | 3/1992 | Morrow | |
| 9,376,536 B2 * | 6/2016 | Berlin | ............... C07G 1/00 |
| 10,421,861 B2 * | 9/2019 | Samec | ............... C10M 107/20 |
| 2009/0209739 A1 * | 8/2009 | Funaoka | ............... B01J 20/0211 |
| | | | 530/502 |
| 2010/0075878 A1 * | 3/2010 | Gizaw | ............... A61K 8/97 |
| | | | 510/119 |
| 2014/0243511 A1 * | 8/2014 | Tamminen | ............... C07G 1/00 |
| | | | 530/500 |
| 2016/0355535 A1 * | 12/2016 | Venditti | ............... C07G 1/00 |
| 2017/0044328 A1 * | 2/2017 | Balakshin | ............... C07G 1/00 |
| 2017/0166749 A1 * | 6/2017 | Chen-Sarkanen | ............... C08H 6/00 |
| 2017/0253740 A1 * | 9/2017 | Murai | ............... C08L 21/00 |
| 2017/0298192 A1 * | 10/2017 | Samec | ............... C07G 1/00 |
| 2018/0002607 A1 * | 1/2018 | Bachmann Nielsen | ............... |
| | | | C10L 1/026 |
| 2018/0037831 A1 * | 2/2018 | De Jong | ............... C08H 6/00 |

FOREIGN PATENT DOCUMENTS

| | | |
|---|---|---|
| SE | 538740 C2 | 11/2016 |
| WO | WO 2014/097108 | 6/2014 |

OTHER PUBLICATIONS

Brauns et al., "Lignin Ethers and Esters—Preparation from Lead and Other Metallic Derivatives of Lignin", Industrial and Engineering Chemistry, 1945, 37(1): 70-73.

* cited by examiner

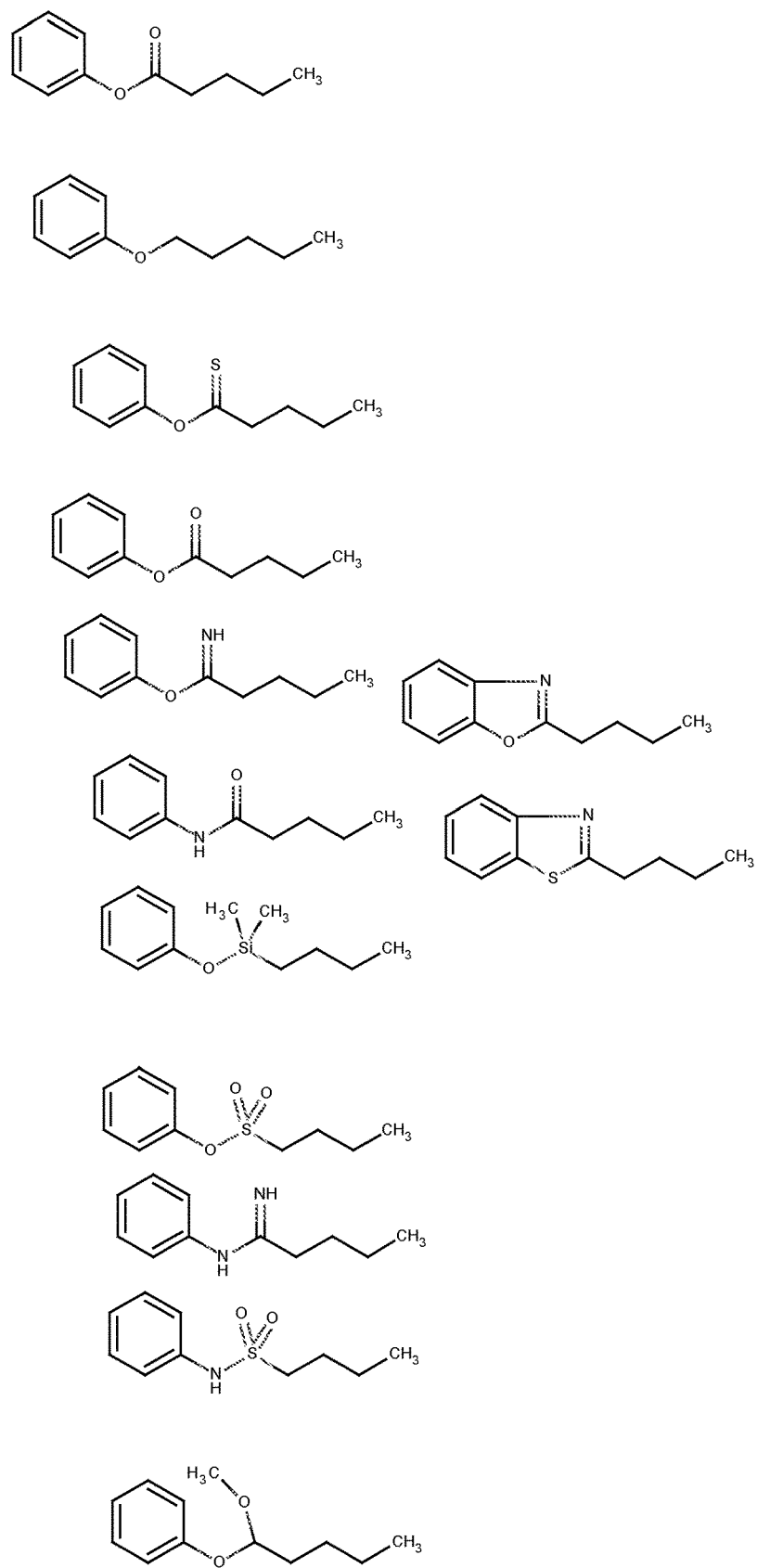
Figure 1. Continues =>

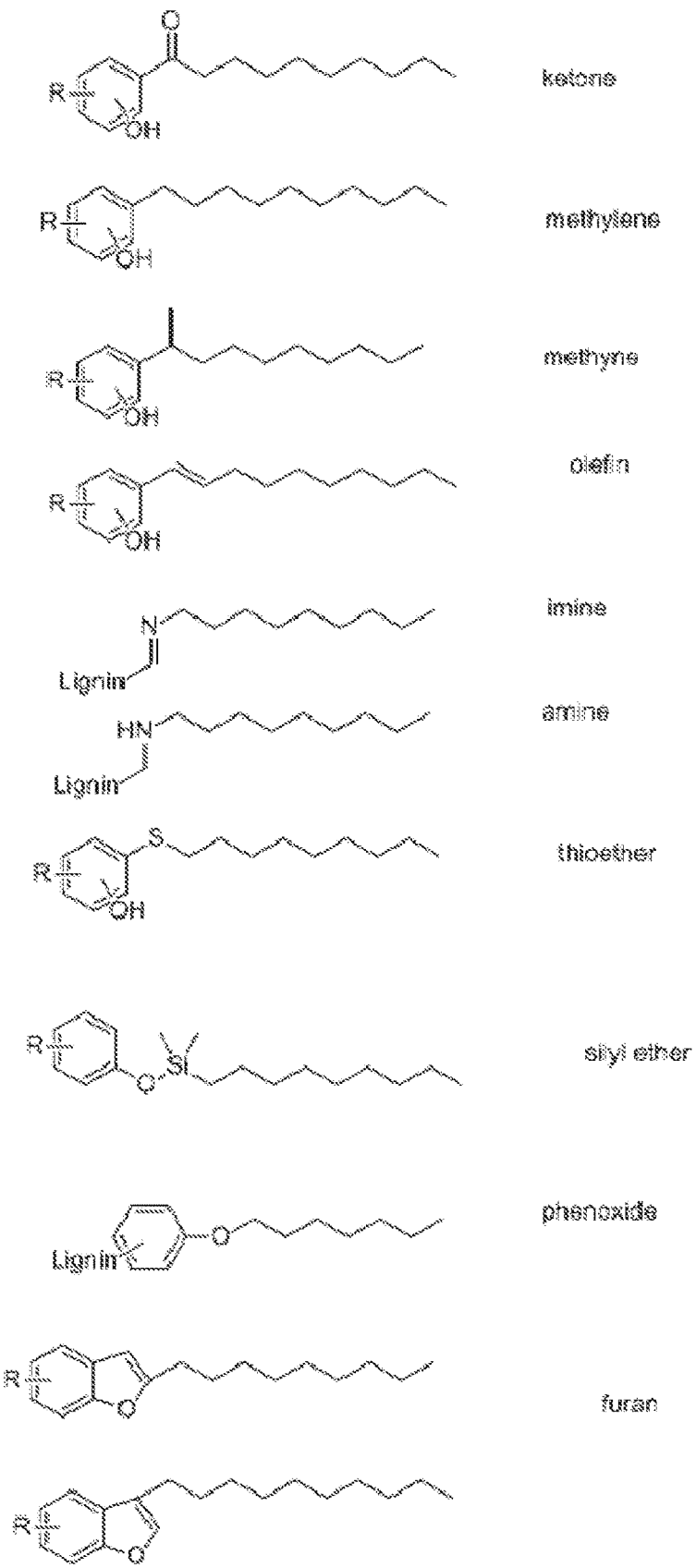
Cont. Figure 1

| Ester group | Sub. degree % | EA weight% | EtOH weight% | MeTHF weight% | CPME weight% | furfural weight% | iPrOH weight% | RTD weight% | LGO weight% | oleic acid weight% | methyl oleate weight% |
|---|---|---|---|---|---|---|---|---|---|---|---|
| C18-ω9 | 85 | 53 | 53 | 47 | 55 | 53 | 54 | 43 | 48 | 47 | 48 |
| C18-ω9 | 60 | 51 | 52 | 46 | 42 | 43 | 51 | 28 | 37 | 26 | 35 |
| C18-ω9 | 50 | 38 | 42 | 43 | 44 | 38 | 50 | 34 | 33 | 26 | 30 |
| C18-ω9 | 40 | 36 | 45 | 42 | 35 | 38 | 43 | 13 | *6* | 5 | 25 |
| C8 | 100 | 30 | 34 | 31 | 38 | 31 | 30 | 30 | 28 | 34 | 35 |
| C10 | 100 | 26 | 36 | 35 | 32 | 27 | 32 | 31 | 30 | 32 | 29 |

Bold=Fully dissolved

*Italic* = not dissolved

Figure 2

| Lignin | Sub. Degree % (eq.) | EA w% | EtOH w% | MeTHF w% | CPME w% | furfural w% | iPrOH w% | RTD w% | LGO w% | oleic acid w% | methyl oleate w% |
|---|---|---|---|---|---|---|---|---|---|---|---|
| LGTPA2 | 0 | 2 | n/a | 2 | 2 | 42 | 3 | n/a | n/a | n/a | n/a |
| C2 | 100 (0.92) | 50 | 56 | 53 | 12 | 48 | 11 | not dissolved | n/a | n/a | n/a |
| C4 | 100 (1.33) | 46 | 47 | 40 | 41 | 39 | 38 | 5 | 4 | 5 | 4 |
| C6 | 100 (1.43) | 50 | 56 | 53 | 42 | 38 | 56 | 25 | 7 | 27 | 30 |
| C6-ω3 | 100 (0.91) | 69 | 59 | 52 | 48 | 42 | 44 | 9 | 8 | 10 | 8 |
| C12 | 100 (1.09) | 56 | 70 | 57 | 49 | 59 | 60 | 48 | 46 | 48 | 47 |
| C14 | 100 (1.27) | 41 | 52 | 56 | 48 | 42 | 53 | 42 | 46 | 47 | 41 |
| C14 | 20 (0.26) | 49 | 54 | 53 | 35 | 36 | 44 | 9 | 8 | 9 | 9 |
| C14 | 9 (0.12) | 8 | 65 | 42 | 8 | 50 | 9 | 8 | 9 | 10 | 8 |
| C18 | 100 (1.22) | 77 | 72 | 79 | 77 | 71 | 72 | 61 | 62 | 66 | 62 |
| C18 (at RT) | 100 (1.22) | 51 | n/a | 42 | 54 | n/a | n/a | 37 | 39 | 33 | 44 |
| C18 | 25 (0.31) | 52 | 57 | 57 | 41 | 52 | 57 | 7 | 8 | 11 | 9 |
| C18 | 9 (0.11) | 7 | 61 | 51 | 8 | 53 | 8 | 8 | 9 | 8 | 7 |
| C18-ω9 (at RT) | 100 (1.24) | 66 | n/a | 58 | 62 | 53 | n/a | 45 | 52 | 49 | 60 |
| C18-ω9 | 16 (0.20) | 48 | 65 | 57 | 44 | 56 | 57 | 8 | 8 | 17 | 8 |
| C18-ω9 | 5 (0.056) | 7 | 64 | 54 | 8 | 54 | 8 | 7 | 9 | 7 | 8 |
| C18-ω6-ω9 | ~10 (0.096) | 7 | 59 | 39 | 6 | 41 | 9 | 8 | 11 | 10 | 9 |
| C22 | 100 (1.35) | 83 | 11 | 76 | 67 | 66 | 75 | 57 | 45 | 48 | 48 |
| C22 | 18 (0.24) | 50 | 67 | 55 | 43 | 40 | 49 | 9 | 11 | 6 | 11 |
| C22 | 7 (0.088) | 9 | 61 | 40 | 7 | 52 | 45 | 7 | 10 | 9 | 9 |
| C22-ω9 | 100 (1.07) | 62 | 63 | 75 | 62 | 56 | 56 | 41 | 46 | 48 | 53 |

FIG. 3

| | | | | | | | | | | |
|---|---|---|---|---|---|---|---|---|---|---|
| C22-ω9 | 17 (0.18) | 46 | 53 | 53 | 43 | 40 | 51 | 6 | 12 | 9 | 10 |
| C22-ω9 | 6 (0.061) | *8* | 49 | 43 | *8* | 37 | 43 | *8* | *10* | *9* | *8* |
| GM63-C2 | 100 (0.94) | 49 | 64 | 54 | *12* | 60 | 56 | *10* | *10* | *12* | *9* |
| GM63-RTD | ~24 (0.24) | 51 | 63 | 60 | 38 | 50 | 57 | *13* | *9* | *13* | *9* |
| CF-C2 | 100 (1.08) | 55 | 62 | 62 | *9* | 59 | 60 | *9* | *11* | *12* | *11* |
| CF-RTD | ~18 (0.18) | 59 | 64 | 56 | 52 | 58 | 55 | *8* | *9* | *12* | *9* |
| C18-ω9:C2 | 27 (0.31): 73 (0.83) | 63 | 68 | 64 | 57 | 59 | 62 | *5* | *6* | *6* | 28 |

LGTPA2=Lignin type A2

Bold=Fully dissolved

*Italic* = not dissolved

FIG. 3 (Cont.)

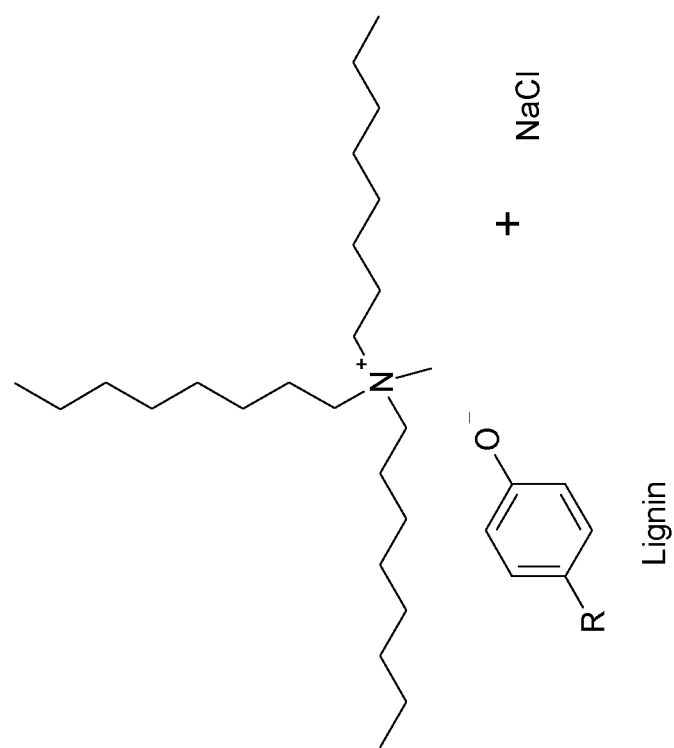

COMPOSITION COMPRISING DERIVATIZED LIGNIN FOR FUEL PRODUCTION

CROSS-REFERENCE TO RELATED APPLICATIONS

This application is a § 371 national phase of International Application No. PCT/SE2016/050584, filed on Jun. 15, 2016, which claims the benefit of Swedish Application No. 1550813-8, filed on Jun. 15, 2015 and Swedish Application No. 1650594-3, filed on May 3, 2016, which applications are incorporated by reference herein.

FIELD OF THE INVENTION

The present invention relates to a composition of lignin and a solvent where the lignin has been modified with an alkyl containing group via a linker in order to increase the solubility of the lignin in suitable solvents.

BACKGROUND

There is an increasing interest in using biomass as a source for fuel production. Biomass includes, but is not limited to, plant parts, fruits, vegetables, processing waste, wood chips, chaff, grain, grasses, corn, corn husks, weeds, aquatic plants, hay, paper, paper products, recycled paper and paper products, lignocellulosic material, lignin and any cellulose containing biological material or material of biological origin.

An important component of biomass is the lignin present in the solid portions of the biomass. Lignin comprises chains of aromatic and oxygenate constituents forming larger molecules that are not easily treated. A major reason for difficulty in treating the lignin is the inability to disperse the lignin for contact with catalysts that can break the lignin down.

Lignin is one of the most abundant natural polymers on earth. One common way of preparing lignin is by separation from wood during pulping processes. Only a small amount (1-2%) is utilized in specialty products whereas the rest primary serves as fuel. Even if burning lignin is a valuable way to reduce usage of fossil fuel, lignin has significant potential as raw material for the sustainable production of chemicals and liquid fuels.

Various lignins differ structurally depending on raw material source and subsequent processing, but one common feature is a backbone consisting of various substituted phenyl propane units that are bound to each other via aryl ether or carbon-carbon linkages. They are typically substituted with methoxyl groups and the phenolic and aliphatic hydroxyl groups provide sites for e.g. further functionalization. Lignin is known to have a low ability to sorb water compared to for example the hydrophilic cellulose.

Today lignin may be used as a component in for example pellet fuel as a binder but it may also be used as an energy source due to its high energy content. Lignin has higher energy content than cellulose or hemicelluloses and one gram of lignin has on average 22.7 KJ, which is 30% more than the energy content of cellulosic carbohydrate. The energy content of lignin is similar to that of coal. Today, due to its fuel value lignin that has been removed using the kraft process, sulphate process, in a pulp or paper mill, is usually burned in order to provide energy to run the production process and to recover the chemicals from the cooking liquor.

There are several ways of separating lignin from black or red liquor obtained after separating the cellulose fibres in the kraft or sulphite process respectively, during the production processes. One of the most common strategies is ultrafiltration. Lignoboost® is a separation process developed by Innventia AB and the process has been shown to increase the lignin yield using less sulphuric acid. In the Lignoboost® process, black liquor from the production processes is taken and the lignin is precipitated through the addition and reaction with acid, usually carbon dioxide ($CO_2$), and the lignin is then filtered off. The lignin filter cake is then re-dispersed and acidified, usually using sulphuric acid, and the obtained slurry is then filtered and washed using displacement washing. The lignin is usually then dried and pulverized in order to make it suitable for lime kiln burners or before pelletizing it into pellet fuel.

Biofuel, such as biogasoline and biodiesel, is a fuel in which the energy is mainly derived from biomass material or gases such as wood, corn, sugarcane, animal fat, vegetable oils and so on. However the biofuel industries are struggling with issues like food vs fuel debate, efficiency and the general supply of raw material. At the same time the pulp or paper making industries produces huge amounts of lignin which is often, as described above, only burned in the mill. Two common strategies for exploring biomass as a fuel or fuel component are to use pyrolysis oils or hydrogenated lignin.

In order to make lignin more useful one has to solve the problem with the low solubility of lignin in organic solvents. One drawback of using lignin as a source for fuel production is the issue of providing lignin in a form suitable for hydrotreaters or crackers. The problem is that lignin is not soluble in oils or fatty acids which is, if not necessary, highly wanted.

Prior art provides various strategies for degrading lignin into small units or molecules in order to prepare lignin derivatives that may be processed. These strategies include hydrogenation, dexoygenation and acid catalyst hydrolysis. WO2011003029 relates to a method for catalytic cleavage of carbon-carbon bonds and carbon-oxygen bonds in lignin. US20130025191 relates to a depolymerisation and deoxygenation method where lignin is treated with hydrogen together with a catalyst in an aromatic containing solvent. All these strategies relates to methods where the degradation is performed prior to eventual mixing in fatty acids or oils. WO2008157164 discloses an alternative strategy where a first dispersion agent is used to form a biomass suspension to obtain a better contact with the catalyst. These strategies usually also requires isolation of the degradation products in order to separate them from unwanted reagents such as solvents or catalysts.

The economic benefits of producing fuels from biomass depend for example on an efficient process for preparing the lignin and on the preparation of the lignin or lignin derivatives so that the fuel production is as efficient as possible. For example the amount of oxygen should be as low as possible and the number of preparation steps should be as few as possible.

One way of making fuel production of lignin more beneficial would be if lignin may be processed using common oil refinery techniques such catalytic cracking or hydrotreatment.

SUMMARY OF THE INVENTION

The object of the present invention is to overcome the drawbacks of the prior art and provide a composition comprising lignin and a solvent. The solvent may comprise fatty acid or oil. In order to obtain the composition the hydroxyl groups or aryl groups of the lignin have been functionalized or modified with an alkyl containing group wherein the alkyl containing group may be an alkyl group, an alkyl ester, an alkyl ether or any other group comprising an alkyl group or section or block. One application for the composition may be as a raw material for fuel production or as an additive to fuel or oil.

In a first aspect the present invention relates to a composition comprising lignin and a solvent;
wherein the lignin comprises at least one alkyl containing group connected to the lignin via a linker group.

In a second aspect the present invention relates to a method of preparing the composition according to the present invention comprising
providing lignin wherein the lignin comprises at least one alkyl containing group connected to the lignin via a linker group;
providing a solvent; and
mixing the lignin with the solvent.

In a third aspect the present invention relates to a method of preparing fuel comprising treating the composition according to the present invention in a hydrotreater or a catalytic cracker.

In a fourth aspect the present invention relates to a fuel obtained from the composition according to the present invention.

In a fifth aspect the present invention relates to the use of the composition to producing chemicals, such as aromatic compounds, or paint.

In a sixth aspect the present invention relates to a fuel additive comprising the composition according to the present invention.

In a seventh aspect the present invention relates to a fuel comprising the composition according to the present invention.

In an eight aspect the present invention relates to the use of the composition according to the present invention as grinding aid, set retarder for cement, strengthener of cement, antioxidant, enhancer of thermal protection, stabilizer in asphalt, emulsifying agent, fiber strengthening additive, cross-linking agent, board binder, anti-corrosion additive, wear resistant additive, antifriction additive, binder, emulsifier or dispersing agent, cross-linking or curing agent, or as a water absorption inhibitor or as a fluidization agent, as an anti-bacterial or anti-fungal surface or as a barrier, to impregnate wood or as an anti-corrosion agent.

In a ninth aspect the present invention relates to the use of the composition according to the present invention for preparing fuel such as petrol and diesel, or diesel and petrol analogues, or biogasoline or biodiesel; or fuel additives.

In a tenth aspect the present invention relates to lignin wherein the lignin comprises at least one alkyl containing group connected to the lignin via a linker group wherein the linker is selected from ketone, acetal, methylene, methyne, olefin, amide, thioester, thioether, imide, imide amide, carbamate, carbamothioic acid, sulfonyl, sulfonamide, silyl oxy, silyl ether, phenoxide, furan, phosphorous acid, quaternary ammonium or hetero cycles or wherein some of the alkyl containing groups are linked to the lignin via an ether linker and some of the alkyl containing groups are linked via an ester linker.

All the embodiments disclosed herein apply to all the aspects of the present invention.

BRIEF DESCRIPTION OF FIGURES

FIG. 1, schematic figure of examples of possible linkers. The aryl ring represents the lignin.

FIG. 2, table of solubility for esterified lignin in various solvents and carrier liquids (values given as weight % esterified lignin).

FIG. 3, table of solubility for esterified lignin in various solvents and carrier liquids (values given as weight % esterified lignin).

(EA=ethyl acetate, EtOH=ethanol, MeTHF=methylated tetrahydrofuran, CPME=cyclopentyl methyl ether, iPrOH=isopropanol, RTD=tall oil, LGO=light gas oil, CF=membrane filtered lignin, LGTPA=acid precipitated lignin from black liquor dried to 95% dry weight and GM63=lignin chemically reduced using the method according to WO2012/121659)

Figure 4:
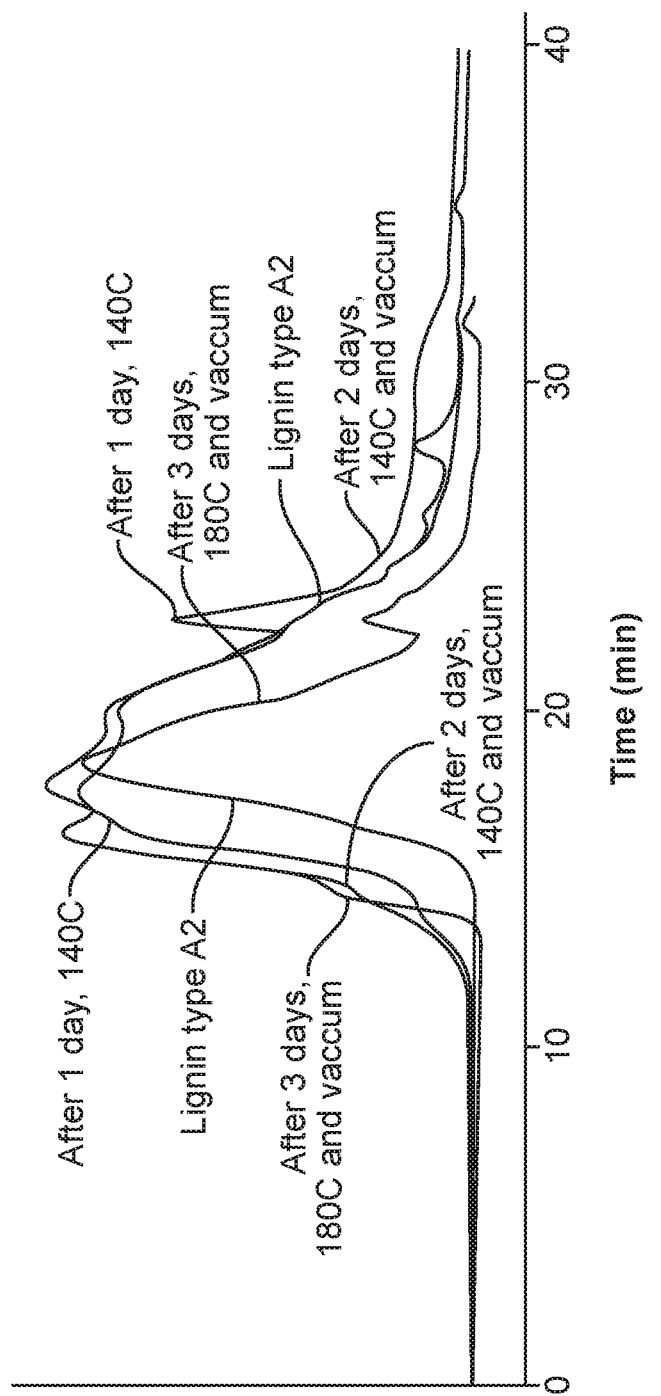

FIG. 4, GPC of esterified lignin according to the present invention.

Figure 5:
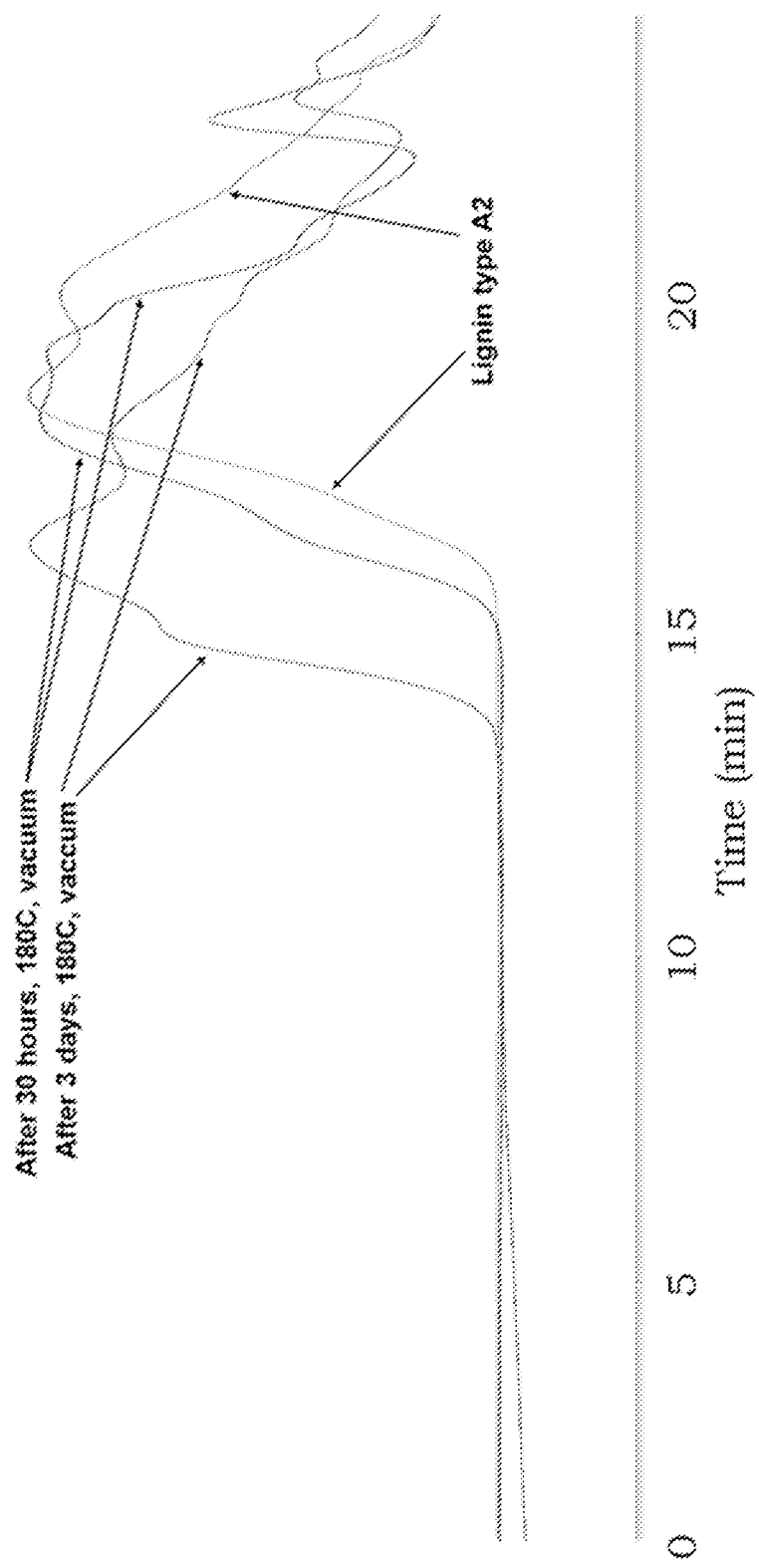

FIG. 5, GPC of esterified lignin according to the present invention.

Figure 6A:
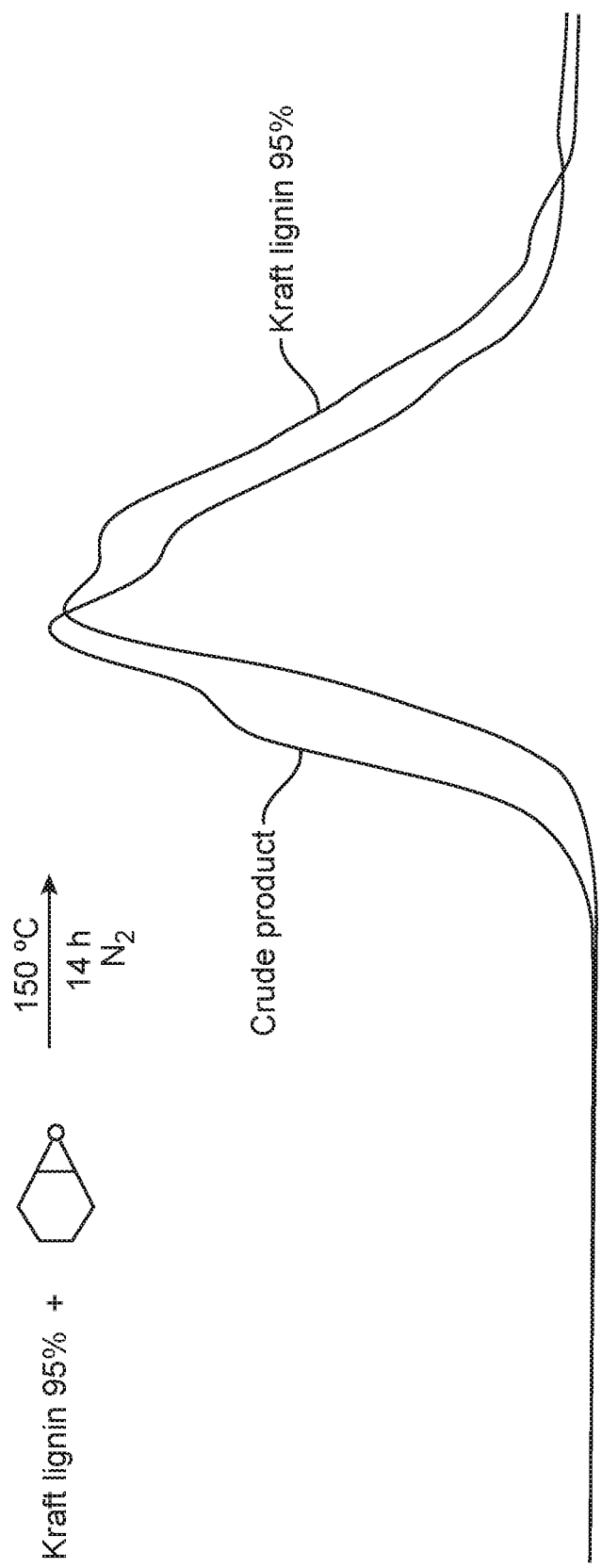
Figure 6B:
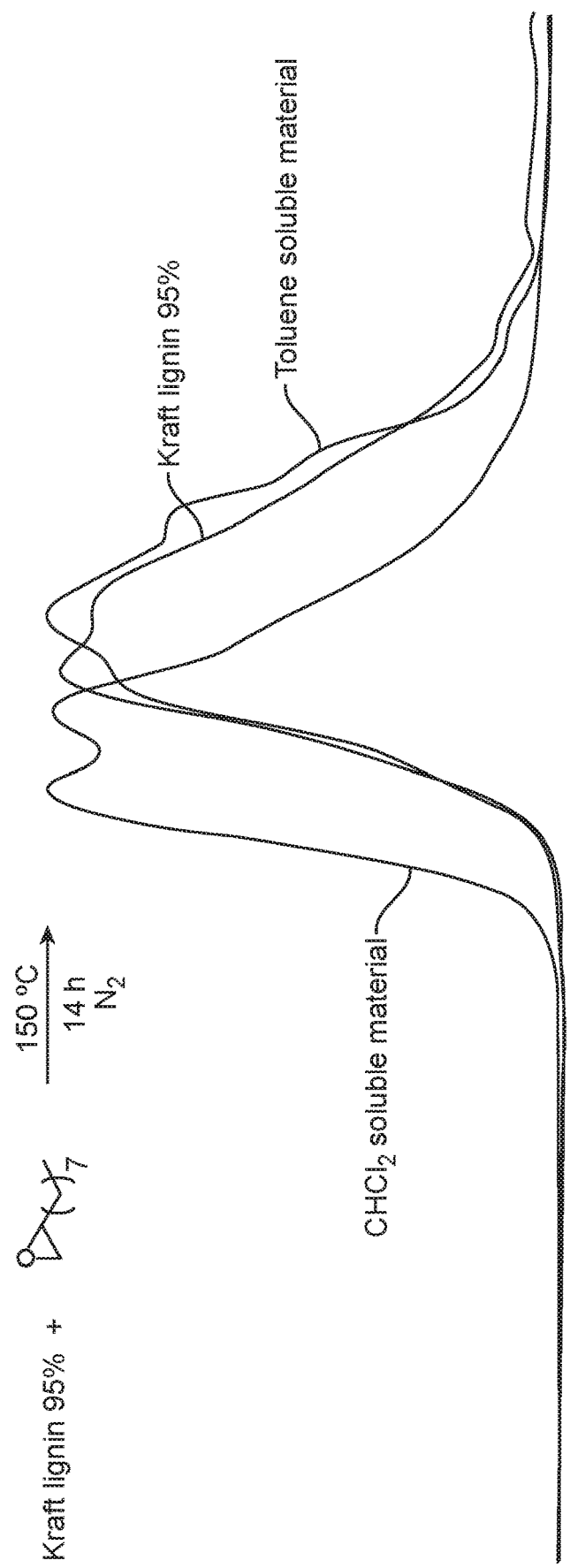
Figure 6C:
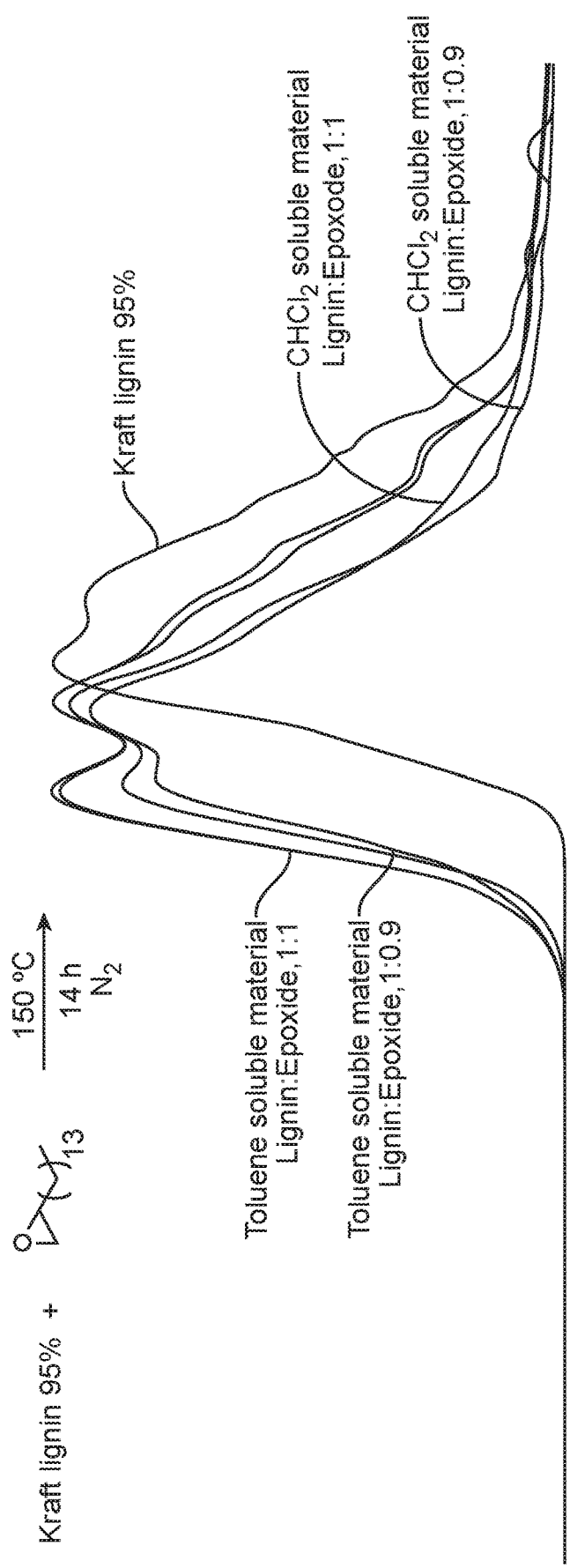

FIG. 6a-c, GPC of etherified lignin.

FIG. 7, schematic figure of quaternary ammonium modified lignin.

Figure 8:
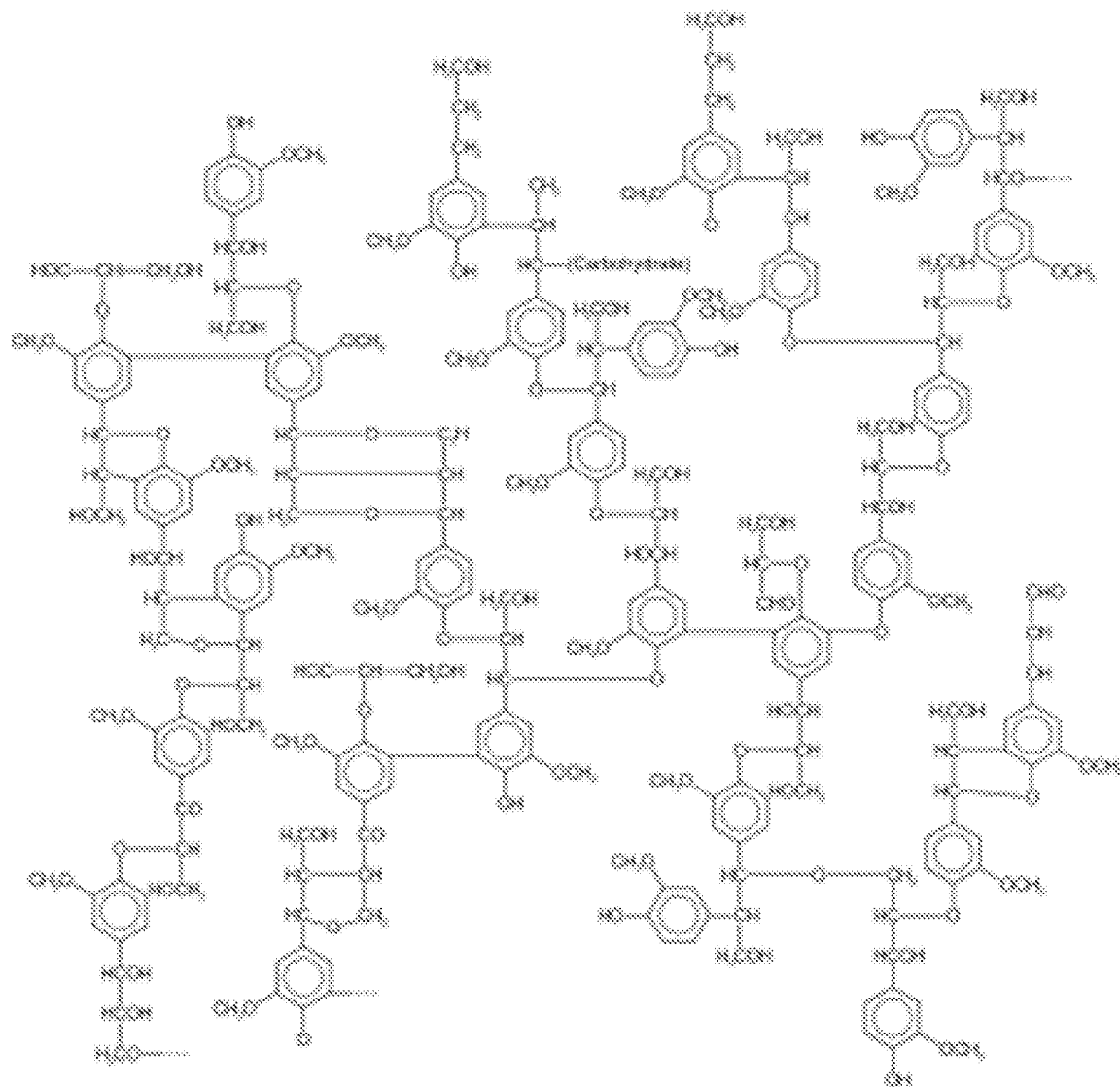

FIG. 8, a schematic figure of lignin.

Figure 9:
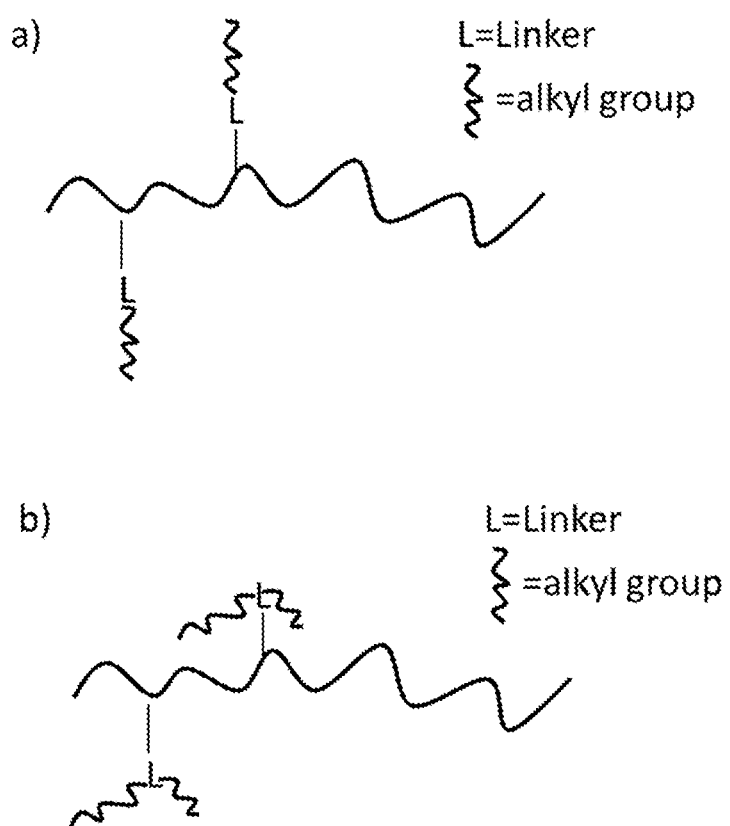

FIG. 9, a schematic figure of the lignin according to the present invention, a) an alkyl containing group linked to lignin via linker, b) two alkyl containing groups linked to lignin via linker.

DETAILED DESCRIPTION OF THE INVENTION

The present invention relates to a composition for use in a refinery processes for the production of various fuels or chemicals.

In the present application the term "lignin" means a polymer comprising coumaryl alcohol, coniferyl alcohol and sinapyl alcohol monomers. FIG. 8 discloses a schematic picture of a part of lignin.

In the present application the term "carrier liquid" means a liquid selected from fatty acids or mixture of fatty acids, esterified fatty acids, rosin acid, crude oil, mineral oil, bunker fuel and hydrocarbon oils or mixtures thereof or a liquid comprising fatty acids or mixture of fatty acids, esterified fatty acids, rosin acid, crude oil, mineral oil, bunker fuel and hydrocarbon oils or mixtures thereof.

In the present invention the term "oil" means a nonpolar chemical substance that is a viscous liquid at ambient temperature and is both hydrophobic and lipophilic.

In the present application the terms "red liquor" and "brown liquor" denote the same liquor.

In the present application the term "linker" or "linker group" are used interchangeably and means any group which can connect lignin with an alkyl containing group. Non-limiting examples of a linker is ester, ether, amide and carbamide.

For a substance to be processed in a refinery such as an oil refinery or bio oil refinery, the substance needs to be in liquid phase. Either the substance is in liquid phase at a given temperature (usually below 80° C.) or the substance is solvated in a liquid. In this patent application, such liquid will be given the term solvent or carrier liquid. The present invention presents a composition and a method of preparing said composition where the composition comprises lignin, where the composition is in liquid phase and may be processed in a refinery such as an oil refinery. The present invention makes it easier or even facilitates production of fuel from lignin through conventional oil refinery processes.

Lignin

In order to obtain lignin biomass may be treated in any suitable way known to a person skilled in the art. The biomass may be treated with pulping processes or organosols processes for example. Biomass includes, but is not limited to wood, fruits, vegetables, processing waste, chaff, grain, grasses, corn, corn husks, weeds, aquatic plants, hay, paper, paper products, recycled paper, shell, brown coal, algae, straw, bark or nut shells, lignocellulosic material, lignin and any cellulose containing biological material or material of biological origin. In one embodiment the biomass is wood, preferably particulate wood such as saw dust or wood chips. The wood may be any kind of wood, hard or soft wood, coniferous tree or broad-leaf tree. A non-limiting list of woods would be pine, birch, spruce, maple, ash, mountain ash, redwood, alder, elm, oak, larch, yew, chestnut, olive, cypress, banyan, sycamore, cherry, apple, pear, hawthorn, magnolia, sequoia, walnut, karri, coolabah and beech.

It is preferred that the biomass contains as much lignin as possible. The Kappa number estimates the amount of chemicals required during bleaching of wood pulp in order to obtain a pulp with a given degree of whiteness. Since the amount of bleach needed is related to the lignin content of the pulp, the Kappa number can be used to monitor the effectiveness of the lignin-extraction phase of the pulping process. It is approximately proportional to the residual lignin content of the pulp.

$$K \approx c*l$$

K: Kappa number; c: constant ≈6.57 (dependent on process and wood); l: lignin content in percent. The Kappa number is determined by ISO 302:2004. The kappa number may be 20 or higher, or 40 or higher, or 60 or higher. In one embodiment the kappa number is 10-100.

The biomass material may be a mixture of biomass materials and in one embodiment the biomass material is black or red liquor, or materials obtained from black or red liquor. Black and red liquor contains cellulose, hemi cellulose and lignin and derivatives thereof. The composition according to the present invention may comprise black or red liquor, or lignin obtained from black or red liquor.

Black liquor comprises four main groups of organic substances, around 30-45 weight % ligneous material, 25-35 weight % saccharine acids, about 10 weight % formic and acetic acid, 3-5 weight % extractives, about 1 weight % methanol, and many inorganic elements and sulphur. The exact composition of the liquor varies and depends on the cooking conditions in the production process and the feedstock. Red liquor comprises the ions from the sulfite process (calcium, sodium, magnesium or ammonium), sulfonated lignin, hemicellulose and low molecular resins.

The lignin according to the present invention may be Kraft lignin (lignin obtained from the Kraft process), sulfonated lignin, Lignoboost® lignin, precipitated lignin, filtrated lignin, acetosolv lignin or organosolv lignin. In one embodiment the lignin is Kraft lignin, acetosolv lignin or organosolv lignin. In another embodiment the lignin is Kraft lignin. In another embodiment the lignin is organosolv lignin. In another embodiment the lignin obtained as residual material from ethanol production. The lignin may be in particulate form with a particle size of 5 mm or less, or 1 mm or less.

Native lignin or Kraft lignin is not soluble in most organic solvents, fatty acids or oils. Instead prior art have presented various techniques to depolymerize and covert the depolymerized lignin into components soluble in the wanted media.

The weight average molecular weight (mass) ($M_w$) of the lignin according to the present invention may be 30,000 g/mol or less, such as not more than 20,000 g/mol, or not more than 10,000 g/mol, or not more than 5,000 g/mol, or not more than 2,000 g/mol, but preferably higher than 1,000 g/mol, or higher than 1,200 g/mol, or higher than 1,500 g/mol. In one embodiment the number average molecular weight of the lignin is between 1000 and 4,000 g/mol, or between 1,500 and 3,500 g/mol.

Modified or Derivatized Lignin

The lignin according to the present invention is modified or derivatized with an alkyl containing group. The alkyl containing group may be but is not limited to an alkyl group, an alkyl ester, an alkyl ether or any other group comprising an alkyl group or section or block The alkyl containing group is connected to the lignin via a linker group which is derived from a hydroxyl group or connected to an aryl group on the lignin according to the following schematic chemical structures:

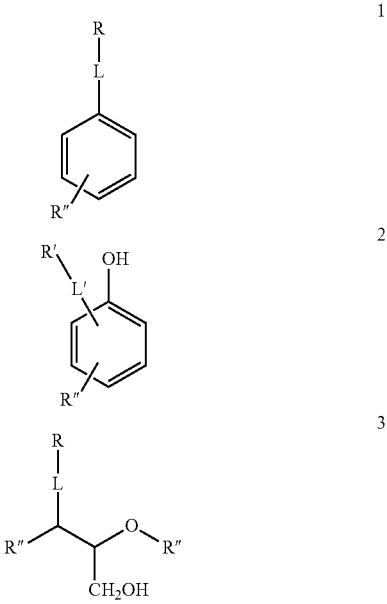

where the lignin is schematically represented by the R" and the aryl (structure 1 and 2) or aliphatic (structure 3) groups respectively, L and L' are the linkers and R and R' are the alkyl containing groups. Since lignin has aliphatic hydroxyl groups as well as aromatic hydroxyl groups the linker L may be at an aliphatic part of lignin (structure 3). The linker L' may also be connected direct to the aryl group in lignin, i.e. not via a hydroxyl group (structure 2). R" may be hydrogen, alkyl, aryl or alkoxy group or any other group found in lignin. The aryl group of the lignin may comprise more than one R".

The linker (L) may be an ether, ester, ketone, acetal, methylene, methyne, olefin, amide, thioester, thioether, imide, imide amide, carbamate, carbamothioic acid, sulfonyl, sulfonamide, silyl oxy, silyl ether, phenoxide, furan, phosphorous acid, quaternary ammonium or hetero cycles or any other group shown in FIG. 1. In one embodiment the linker is ether. In one embodiment the linker is ester. In one embodiment the linker is ketone. In one embodiment the linker is acetal. In one embodiment the linker is methylene. In one embodiment the linker is methyne. In one embodiment the linker is olefin. In one embodiment the linker is amide. In one embodiment the linker is thioester. In one embodiment the linker is thioether. In one embodiment the linker is imide. In one embodiment the linker is imide amide. In one embodiment the linker is sulfonyl. In one embodiment the linker is quaternary ammonium. In one embodiment the linker L' is a ketone. In one embodiment the linker L' is an aldehyde. FIG. 1 discloses a non-limiting list of possible linkers. In FIG. 1 the aryl groups represents lignin and the linker may be derived from an aliphatic hydroxyl group as well. Depending on the linking group and the linking agent the linker may be connected to the lignin chain at different parts such as via hydroxyl groups or the aryl groups. FIG. 9 shows a schematic view of the functionalized lignin according to present invention.

In one embodiment the lignin is modified with alkyl containing groups and where some of the alkyl containing groups are linked to the lignin via an ether linker and some of the alkyl containing groups are linked via an ester linker. The amount of ether linkages may be 10-90%, such as 20% or higher, or 40% or higher, or 60% or higher, or 90% or lower or 70% or lower of the total amount of linkers. In one embodiment the amount of ether linkages is 40-60%. The amount of ester linkages may be 10-90%, such as 20% or higher, or 40% or higher, or 60% or higher, or 90% or lower or 70% or lower of the total amount of linkers. In one embodiment the amount of ether linkages is 40-60%. The combination of ester and ether linkages have shown to increase the solubility of the lignin in carrier liquids, especially gas oils such as light gas oil. By functionalizing using different linkers the functionalization will be less dependent on the availability of the functional group and reagents but still obtain a soluble lignin product. Using different linkers may also make the process and the final product cheaper due to that the amount of more expensive reagents may be reduced but still obtain a soluble product for example.

When the lignin is bound to a quaternary ammonium the bond between the lignin and the quaternary ammonium is ionic. The quaternary ammonium may be any quaternary ammonium having the general formula

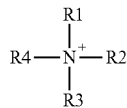

where each R1 to R4 are individually selected from a hydrogen, alkyl, alkoxy alkyl, alkyl alkoxy alkyl or alkyl ester wherein at least one of R1 to R4 is alkyl, alkoxy alkyl, alkyl alkoxy alkyl or alkyl ester. In one embodiment R1 is a methyl group or hydrogen. In another embodiment each R2 to R4 are alkyl groups. In one embodiment each R2 to R4 comprises a C6 or longer alkyl group, or a C12 or longer alkyl group. In one embodiment comprises R3 and R4 a C12 or longer alkyl group. In one embodiment the quaternary ammonium is a [alkyl]$_2$N(CH$_3$)$_2$$^+$ or [alkyl ester]$_2$N(CH$_3$)$_2$$^+$ or [alkyl]$_3$N(CH$_3$)$^+$ or [alkyl ester]$_3$N(CH$_3$)$^+$ where the alkyl is a C7 or longer alkyl. In one embodiment the counter ion to the quaternary ammonium is not chloride. In another embodiment the counter ion is HSO$_4$. In another embodiment the quaternary ammonium is tricaprylylmethyl ammonium chloride, [CH$_3$(CH$_2$)$_{17}$]$_2$N(CH$_3$)$_2$HSO$_4$, (CH$_2$)$_{18}$)$_2$N$^+$(CH$_3$)$_2$)Cl$^-$, [CH$_3$(CH$_2$)$_7$]$_3$NCH$_3$Cl, or [alkyl]$_2$N(CH$_3$)$_2$HSO$_4$ or [alkyl ester]$_2$N(CH$_3$)$_2$HSO$_4$. FIG. 7 discloses a schematic picture of lignin modified with a quaternary ammonium.

The alkyl section of the alkyl containing group of the modified lignin may be a C1 or longer alkyl group, such as or C2 or longer, or a C3 or longer group, or C5 or longer, or C6 or longer, or C7 or longer, or C8 or longer, or C9 or longer, or C10 or longer, or C12 or longer, or C14 or longer, or C16 or longer.

The degree of modification of the hydroxyl groups expressed as number of equivalents to lignin repeating units. The number of equivalents may be 0.2 or higher, or 0.4 or higher, or 0.6 or higher, or 0.8 or higher. In this application the repeating unit of lignin is assumed to have a molecular weight of 180 g/mol.

The modified lignin according to the present invention may have a weight average molecular weight ($M_w$) of 1,000 g/mol or higher, or 1,200 g/mol or higher, or 1,500 g/mol or higher, or 1,800 g/mol or higher, or 2,000 g/mol or higher, or 2,500 g/mol or higher, or 3,500 g/mol or higher but less than 10,000 g/mol, or less than 6,000 g/mol. In one embodiment the number average molecular weight ($M_n$) is 1,500 to 4,000 g/mol, or 2,200 g/mol to 3,700 g/mol.

Molecular weight in the present application is determined using GPC (Gel Permeation Chromatography) operated at 20° C. and at flow rate of 1 ml/min using THF as solvent. Polystyrene Standard RedayCal Set M(p) 250-70000 (16 standards) (Sigma product no: 76552). The colons are Styragel THF (pre-colon), Styragel HR 3 THF (7.8×300 mm), Styragel HR 1 THF (7.8×300 mm), Styragel HR 0.5 THF (7.8×300 mm) all from Waters.

Solvent and Carrier Liquids

According to the present invention the composition comprises a solvent. The solvent may be an organic solvent or it may a carrier liquid. The solvent may also be a mixture of a carrier liquid and an organic solvent. The solvent may also comprise hydrotreated or recirculated carrier liquid.

The purpose of the carrier liquid is to carry the substrate, the lignin, into the refinery reactor without reacting or in any other way affecting the substrate. Therefore, in one embodiment of the present application the carrier liquid is an inert hydrocarbon with a high boiling point. When the carrier liquid is a mixture of components such as in an hydrocarbon oil or is a mixture between an oil and a fatty acid, the boiling point of the carrier liquid is preferably in the range of 100-400° C., or 120-280° C., or 150-250° C., preferably at least 150° C. In one embodiment the solvent comprises a carrier liquid selected from a hydrocarbon oil, crude oil, bunker oil, mineral oil, fatty acid or esterified fatty acid. In one embodiment the carrier liquid is a fatty acid or a mixture of fatty acids. In another embodiment the carrier liquid is esterified fatty acids such as FAME (fatty acid methyl ester). In one embodiment the carrier liquid is a crude oil. In one embodiment the carrier liquid is bunker fuel or bunker crude. In another embodiment the carrier liquid is a hydrocarbon oil or a mineral oil. In one embodiment the carrier liquid is a mixture of esterified fatty acid and a mineral oil, hydrocarbon oil, bunker fuel or crude oil. In another embodiment the carrier liquid is a mixture of a hydrocarbon oil or a mineral oil and a fatty acid.

The carrier liquid should preferably be suitable for a hydrotreater or a catalytic cracker (cat cracker), preferably a liquid suitable for both hydrotreater and catalytic cracker. Hydrotreating and catalytic cracking are common steps in the oil refinery process where the sulfur, oxygen and nitrogen contents of the oil is reduced and where high-boiling, high molecular weight hydrocarbons are converted into gasoline, diesel and gases. During hydrotreating the feed is normally exposed to hydrogen gas (20-200 bar) and a hydrotreating catalyst (NiMo, CoMo or other HDS, HDN, HDO catalyst) at elevated temperatures (200-500° C.). The hydrotreatment process results in hydrodesulfurization (HDS), hydrodenitrogenation (HDN), and hydrodeoxygenation (HDO) where the sulphurs, nitrogens and oxygens primarily are removed as hydrogensulfide, ammonia, and water. Hydrotreatment also results in the saturation of olefins. Catalytic cracking is a category of the broader refinery process of cracking. During cracking, large molecules are split into smaller molecules under the influence of heat, catalyst, and/or solvent. There are several sub-categories of cracking which includes thermal cracking, steam cracking, fluid catalyst cracking and hydrocracking. During thermal cracking the feed is exposed to high temperatures and mainly results in homolytic bond cleavage to produce smaller unsaturated molecules. Steam cracking is a version of thermal cracking where the feed is diluted with steam before being exposed to the high temperature at which cracking occurs. In a fluidized catalytic cracker (FCC) or "cat cracker" the preheated feed is mixed with a hot catalyst and is allowed to react at elevated temperature. The main purpose of the FCC unit is to produce gasoline range hydrocarbons from different types of heavy feeds. During hydrocracking the hydrocarbons are cracked in the presence of hydrogen. Hydrocracking also facilitates the saturation of aromatics and olefins.

The esterified fatty acid may be any suitable fatty acid esterified with any suitable group such as a triglyceride. The fatty acid used in the present invention (as fatty acid or as esterified fatty acid) may be a C8 or longer fatty acid, or a C14 or longer fatty acid. In another embodiment the fatty acid or the mixture of the fatty acids comprises unsaturated fatty acids, preferably at a concentration of more than 25 wt %, or more than 50 wt %. In one embodiment the carrier liquid is a tall oil. When the carrier liquid is a mixture of an oil (hydrocarbon oil, mineral oil, crude oil or bunker fuel) and a fatty acid or esterified fatty acid the ratio in said mixture may be in the range 1-99 wt % fatty acid (or esterified fatty acid) and 1-99 wt % of the oil, for example 20-40 wt % fatty acid (or esterified fatty acid) and 60-80 wt % of the oil (hydrocarbon oil, mineral oil, crude oil or bunker fuel). In one embodiment the carrier liquid comprises 1-15 wt % esterified fatty acid, such as 2-10 wt % or 3-6 wt %.

When the carrier liquid is or comprises a hydrocarbon oil the oil needs to be in liquid phase below 80° C. and preferably have boiling points of 177-371° C. These hydrocarbon oils include different types of or gas oils and likewise e.g. light cycle oil (LCO), Full Range Straight Run Middle Distillates, Hydrotreated, Middle Distillate, Light Catalytic Cracked Distillate, distillates Naphtha full-range straight-run, hydrodesulfurized full-range, solvent-dewaxed straight-range, straight-run middle sulfenylated, Naphtha clay-treated full-range straight run, distillates full-range atm, distillates hydrotreated full-range, straight-run light, distillates heavy straight-run, distillates (oil sand), straight-run middle-run, Naphtha (shale oil), hydrocracked, full-range straight run (example of but not restricted to CAS nr: 68476-30-2, 68814-87-9, 64742-46-7, 64741-59-9, 64741-44-2, 64741-42-0, 101316-57-8, 101316-58-9, 91722-55-3, 91995-58-3, 68527-21-9, 128683-26-1, 91995-46-9, 68410-05-9, 68915-96-8, 128683-27-2, 195459-19-9).

Bunker fuel or bunker crude are fuel mainly used for ships, usually very large ships. The bunker fuel may be divided into groups depending on if the fuel is a distillate or a residual or a mixture of both and the chain length. For example No. 1 fuel oil is a distillate with a chain length of 9-16, No. 2 fuel oil (also known as Bunker A) is a distillate with a chain length of 10-20, No. 4 and No. 5 fuel oil (also known as Bunker B) is a distillate and a residual oil respectively with a chain length of 12-70 and No. 6 fuel oil (also known as Bunker C) is a residual (heavy fuel oil) with a chain length of 20-70. No. 5 and 6 are also known as heavy fuel oil (HFO) or furnace fuel oil (FFO). In one embodiment the bunker fuel is a Bunker B. In another embodiment the bunker fuel is a HFO or Bunker C.

The composition may comprise 10-99 weight % of carrier liquid of the total weight of the composition, such as 20 weight % or more, or 40 weight % or more, or 60 weight % or more, or 80 weight % or more, or 99 weight % or less, or 85 weight % or less, or 65 weight % or less. In one embodiment the amount of carrier liquid is 60-90 weight % such as 65-85 weight %.

The solvent may also be an organic solvent or a mixture of organic solvents. In one embodiment the solvent is a mixture of an organic solvent and a carrier liquid. The organic solvent may be but is not limited to oxygenates such as an alcohol, ester, ketone, ether, aldehydes, furan or furfural based solvent. Preferred solvents are C1-C10 alcohols, C1-C10 aldehydes, C2-C15 ketones, C2-C10 ethers, and C2-C10 esters. A non-limiting list of solvents is methanol, ethanol, propanol, isopropanol, glycerol, and butyl ether such as tert-butyl methyl ether; diethyl ether, diglyme, diisopropyl ether, dimethoxyethane, diethylene glycol, diethyl ether, polyethylene glycol, 1,4-dioxane and tetrahydrofuran, methylated tetrahydrofuran, mesityl oxide, furfural, isophorone. Preferred C2-C10 esters are organic esters, aromatic or non-aromatic esters, examples of esters are benzyl benzoate, various acetates such as methyl acetate, ethyl acetate, cyclopentyl methyl ether and butyl acetate, various lactates such as ethyl lactates. Solvents that are similar to or may be converted into fuel or petrol are interesting when the composition is to be used for fuel preparation. Such solvents could be ketones or aldehydes. In one embodiment the solvent is a C2-C15 ketone such as a C4-C12 ketone or a C6-C8 ketone. In one embodiment the solvent is a C1-C10 aldehyde such as a C4-C9 aldehyde or C6-C8 aldehyde. In one embodiment the solvent is a mixture of a C2-C15 ketone and a C1-C10 aldehyde. In one embodiment the solvent is mesityl oxide. In one embodiment the solvent is acetone. In one embodiment the solvent is acetophenone. In one embodiment the solvent is pentanone. In one embodiment the solvent is ethyl isopropyl ketone. In one embodiment the solvent is isophorone. In one embodiment the organic solvent is an aromatic aldehyde or a mixture containing an aromatic aldehyde for example furfural. In one embodiment the solvent comprises furfural or furfuryl alcohol. In one embodiment the solvent is benzaldehyde. In one embodiment the solvent is ethyl acetate. In one embodiment the solvent is a C1-C10 alcohol. In one embodiment the solvent is ethanol. In one embodiment the solvent is methanol. In one embodiment the solvent is isopropanol. In one embodiment the solvent is solketal. In one embodiment the solvent is a C2-C10 ester. In one embodiment the solvent is tetrahydrofuran or methylated tetrahydrofuran. In one embodiment the solvent is 1,4-dioxane.

In one embodiment the solvent comprises a combination of C1-C10 alcohols, C2-C10 ethers and C2-C10 esters. In one embodiment the solvent comprises two C1-C10 alcohols for example ethanol and glycerol, and in another embodiment the solvent comprises propanol and glycerol. In one embodiment the solvent comprises polyethylene glycol and a C1-C10 alcohol. When the solvent is a mixture of an organic solvent and water the mixture may contain methanol and water, ethanol and water, isopropanol and water or ethyl acetate and water, preferably ethanol and water, isopropanol and water and ethyl acetate and water.

In one embodiment the solvent is a mixture of a C2-C15 ketone such as a C4-C12 ketone or a C6-C8 ketone or a C1-C10 aldehyde such as a C4-C9 aldehyde or C6-C8 aldehyde and a carrier liquid. In one embodiment the solvent is a mixture of a C1-C10 alcohol such as a C3-C8 alcohol and a carrier liquid.

In one embodiment the amount of organic solvent in the composition is 1-99 weight % of the total weight of the composition. In one embodiment the amount of solvent is 10-60 weight %, or 20-50 weight %. In one embodiment the amount of organic solvent is 70 weight % or less, or 40 weight % or less, or 20 weight % or less, or 10 weight % or less, or 5 weight % or less, or 2 weight % or less of the total weight of the composition.

Additives

The composition may further comprise at least one additive. The additive may be any additive known to a person skilled in the art. In one embodiment the additive may further enhance the dissolution of the lignin. The additive may have the function of dissolving or breaking up inter molecular bonds between the lignin chains. In one embodiment the additive is a polar compound or a salt.

Preparation of the Lignin and the Composition

The present inventors found that by alkylating the hydroxyl groups or other parts of the lignin the solubility of the lignin increased drastically in more non-polar solvents and even in lipophilic solvents such as oils.

The composition according to the present invention may be prepared by first preparing the lignin that is modified or derivatized with an alkyl containing group via a linker followed by mixing said modified lignin with the solvent. The modified lignin may be isolated from the modification reaction mixture or the modified lignin may be left in the reaction mixture when mixed with the solvent. The modification of the lignin may also be performed in situ, i.e. in the solvent. Then the lignin, the modification agent (linking agent) and the solvent and optionally a catalyst are mixed to form a slurry. The mixing can be done by stirring or shaking or in any other suitable way and the slurry is then heated. Any catalyst and any other unwanted components may be removed afterwards using any suitable technique.

The modification may be performed at 50° C. and 350° C., such as 50° C. or higher, or 80° C. or higher or 100° C. or higher, or 120° C. or higher, or 150° C. or higher, but not higher than 350° C., or 250° C. or lower, or 200° C. or lower, or 180° C. or lower.

When the linker is an ester group the modification agent may be a carboxylic acid or an anhydride. The esterification of the lignin may be performed in the carrier liquid leaving a homogenous composition of carrier liquid and esterified lignin, and optionally catalyst. When the esterification is performed in a carrier liquid comprising a first fatty acid and together with an esterification agent such as an anhydride the obtained esterified lignin is believed to comprise ester groups derived from the anhydride alone but also ester groups derived from an anhydride bond to a first fatty acid. In order to remove any acid groups of remaining fatty acids or fatty acids in the carrier liquid any suitable method may be used. For example an alcohol such as methanol may be added.

The esterified lignin may be isolated by precipitation in for example hexane or water. When the degree of substitution (esterification) is high, for example 50% or more, and the lignin is substituted with C2-C4 ester groups the esterified lignin may be treated with a base for example $NaHCO_3$ (aq.) before precipitation in order to remove free acid. When the lignin is substituted with longer ester groups celite may be used. The esterified lignin according to the present invention may also be separated from metals and other additives or catalysts by simply rinsing the lignin in an aqueous solution or water. For many industries, for example the fuel refinery industry processing lignin, the amount of metals should be as low as possible since metals may damage the machinery or disturb the process. By forming the ester groups in situ, insoluble biomass may become soluble. For example lignin substituted with acetic ester groups is not dissolved in tall oil. However when forming the acetic ester in the tall oil the obtained homogenous mixture comprises 32 wt % of the formed lignin ester.

The esterification agent may be a carboxylic acid or an anhydride. The esterification agents preferably contain an unsaturated bond. Non-limiting examples of carboxylic acids are fatty acids or C2-C42 carboxylic esters, preferably C4 to C22 such as C18, and non-limiting examples of anhydrides are C4 to C42 anhydrides. The ester groups may therefore be C2-C42 or C4-C42 preferably C4-C22 such as C18. Ester groups with longer chains tend to be more easily dissolved, especially in carrier liquids, and increases the C/O ratio. In one embodiment the ester groups is one or more C2-C42 groups, such as C6-C18 groups. Still, especially when using organic solvents, the ester groups may be C2-C18, or C2-C12, C12-C18 or C2-C6 since it was found that the solubility increased substantially even when using shorter ester groups, FIGS. 2 and 3. This may also be true if the lignin is also functionalized via an ether linkage. Another important factor is the availability and the cost of the esterification agent. The catalyst for the esterification may be a nitrogen containing aromatic heterocycle such as N-methyl imidazole or pyridine, or the catalyst may be a metal acetylacetonate such as $TiO(acac)_2$ or $Fe(acac)_3$. In one embodiment the catalyst is DMAP (4-dimethylaminopryidine). Esterification may also be done by transesterification.

When the linker is an ether group the modification agent may be an epoxide. In one embodiment the epoxide is an alkyl epoxide for example a C5 or longer alkyl epoxide, or a C12 or longer alkyl epoxide, or C18 or longer alkyl epoxide. In one embodiment the epoxide is a fatty acid epoxide. The etherification may be performed at 80° C. or higher, or 120° C. or higher, or 150° C. or higher, or 180° C. or higher, preferably at 350° C. or lower, or at 250° C. or lower, or at 200° C. or lower. When the etherification of the lignin occurs in situ a homogenous composition of solvent and ether functionalized lignin, and optionally catalyst, is obtained. The catalyst and any other unwanted components may be removed afterwards.

The etherification may be done by first mixing the lignin with an amine forming a first mixture and then heating the first mixture. To the first mixture an epoxide is then added and a second mixture is obtained which is then heated. The formed ether functionalized lignin is then mixed with the solvent in order to form the composition according to the present invention. The amine may be an alkyl amine for example a C5 or longer alkyl amine, or a C12 or longer alkyl amine. In one embodiment the amine is dodecylamine. The temperature at which the first and the second mixtures are heated may be 100° C. or higher, or 150° C. or higher, or 180° C. or higher. The mixture may be pressurized or refluxed. The amine may be added in a 2:1 to 0.5:1 weight ratio to the lignin, such as 1.10:1 to 0.90:1 or close to 1:1. The epoxide may be added in a 2:1 to 0.5:1 weight ratio to the first mixture, such as 1.10:1 to 0.90:1 or close to 1:1.

The etherification may also be done by mixing lignin with a primary or a secondary epoxide forming a first mixture and then heating the first mixture. To the first mixture may an anhydride be added forming a second mixture which is then heated. The primary or secondary epoxide may be an alkyl epoxide for example a C5 or longer alkyl epoxide, or a C12 or longer alkyl epoxide, or C18 or longer alkyl epoxide. In one embodiment the alkyl epoxide is a C5-C18, or a C6-C14, or a C8-C12. In one embodiment the epoxide is a fatty acid epoxide. The anhydride may be a C4-C10 anhydride. The temperature at which the first and the second mixtures are heated may be 100° C. or higher, or 150° C. or higher, or 180° C. or higher. The mixture may be pressurized or refluxed. The epoxide may be added in a 2:1 to 0.5:1 weight ratio to the first mixture, such as 1.10:1 to 0.90:1 or close to 1:1. The anhydride may be added in a 2:1 to 0.5:1 weight ratio to the lignin.

When the lignin is functionalized via both ester and ether linkers the etherification is preferably done before the esterification.

When the linker is a quaternary ammonium the composition may be prepared by mixing the lignin and the quaternary ammonium salt during heating, optionally together with a solvent, followed by adding the oil and mixing. The obtained composition may be washed using water or acid. By using quaternary ammonium as a linker lignosulfonate may be brought into solution in various solvents and carrier liquids.

The hydroxyl groups of lignin may be divided into aliphatic hydroxyls (ROH), condensed phenol (PhOH), phenol and acids. The degree of substitution, i.e. the degree of hydroxyl groups that has been converted into ester groups, may be from 10% to 100%, for example 20% or more, 30% or more, or 40% or more, or 60% or more or 80% or more, or 99% or more, or 100%. When the solvent comprises an organic solvent the degree of substitution does not have to be as high, for example 10-60% or 20-40%, in comparison when the solvent only comprises a carrier liquid.

One advantage of the present invention is that a higher amount of lignin may be dissolved in a solvent such as a carrier liquid. The amount of lignin in the composition according to the present invention may be 1 weight % or more, or 2 weight % or more, or 4 weight % or more, or 5 weight % or more, or 7 weight % or more, or 10 weight % or more, or 12 weight % or more, or 15 weight % or more, or 20 weight % or more, or 25 weight % or more, or 30 weight % or more, or 40 weight % or more, or 50 weight % or more, or 60 weight % or more, or 70 weight % or more, or 75 weight % or more. In one embodiment the lignin content is 10-40 weight % such as 15-35 weight %.

In one embodiment the lignin is dearomatized. For example the lignin is dearomatized to at least 40%, or at least 50%, or at least 60%, or at least 70%, or at least 80%, or at least 90%, or at least 95%, or at least 99%.

The composition according to the present invention may be a one phase system. By keeping the composition in motion continuously or regularly the composition may stay in one phase for a prolonged time. Since the composition is meant to be used for example in a refinery the composition will be in motion and thereby it will be a one phase system. In one embodiment the composition is a one phase system at 70° C., preferably also at 25° C., when left for 10 minutes, preferably 30 minutes, preferably 1 hour, preferably when left for 24 hours.

Source of Biomass and Pre-treatments

When the method of the present invention is performed using black or red liquor the liquor may be pre-treated by evaporation, separation or filtration or via chemical treatments such as the process described below and further defined in WO2012/121659.

The biomass material from which the lignin in the composition have been obtained from may have been treated with the process described in WO2012/121659 which is hereby incorporated by reference. The process relates to reduction of a substrate wherein said substrate can be but is not limited to primary, secondary and tertiary benzylic or allylic alcohol, benzylic or allylic ether, benzylic or allylic carbonyl, and benzylic or allylic ester, or olefins to the corresponding hydrocarbon. The substrate may be lignin or any other compound or polymer comprising said functional group, or black or red liquor. A general method comprises adding a catalyst, a transition metal catalyst, to a reaction flask or container. Adding a solvent mixture of at least two solvents where one of the solvents is water and a base. The mixture is then heated followed by addition of a hydrogen donor and the substrate to be reduced. In order to inhibit disproportionation, a base or carbon dioxide should be added to the solvent mixture and catalyst prior to addition of a hydrogen donor and the substrate. The hydrogen donor may for example be formic acid or an alcohol, it may even be hydrogen gas. The reduction is performed at a temperature of 40-100° C. In one embodiment the amount of base is not stoichiometric to the amount of the substrate.

The biomass material or preferably the separated lignin obtained from the reduction method may then be used as the biomass material in the composition according to the present invention. In one embodiment the obtained biomass material from the chemical reduction is further treated with filtration, ultra-filtration or cross-flow ultra-filtration; or treated with acidification and separation such as the Lignoboost® technique.

In another embodiment the composition of the present invention comprises lignin obtained through precipitation and separation of lignin for example by acidification and separation, such as filtration. Lignoboost® or any other similar separation technique are examples of such technique and may be used. In another embodiment the separated lignin may further be chemically reduced using the method described above and in WO2012/121659.

Another method or a complimentary method for purifying or separating lignin from biomass is through filtration, ultra-filtration or cross-flow ultra-filtration. When the biomass material comprises lignin, the lignin may be separated in respect to size through any of said filtration techniques. The lignin may also be separated in respect to size through a depolymerisation technique; this separation may be performed in combination with filtration, ultra-filtration or cross-flow ultra-filtration. By using filtration, ultra-filtration or cross-flow ultra-filtration on black or red liquor lignin with molecular weights of 10,000 g/mol or less may be separated, preferably the separated lignin has a molecular weight of 2,000 g/mol or less, such as 1,000 g/mol or less. The separated lignin may then be used as the biomass material in the composition according to the present invention. In one embodiment the lignin obtained from said filtration may further be chemically reduced using the method described above and in WO2012/121659.

Applications

The present invention may be used for preparing fuel or fuel additive. The composition according to the present invention may itself be used as a fuel additive.

The composition according to the present invention may be used in a refinery process or in a pre-step to a refinery process for preparing fuel such as diesel and petrol, or diesel and petrol analogues; or biogasoline or biodiesel; or fuel additives. The composition may further be used to prepare lubricants, oils. For example synthetic oils with boiling point of at least 359° C.

The lignin or the composition according to the present invention may also be used as an additive, for example as a concreted grinding aid, set retarder for cement, strengthener of cement, antioxidant, enhancer of thermal protection, stabilizer in asphalt, emulsifying agent, fiber strengthening additive, cross-linking agent, board binder, anti-corrosion additive, wear resistant additive, antifriction additive, binder, emulsifier or dispersing agent.

The lignin or the composition may further be used to prepare foams, plastics, rubbers or paint. The esterified lignin may be used as a cross-linking or curing agent, or as a water absorption inhibitor or as a fluidization agent. Mechanical properties may also be enhanced by the use of the composition. The composition may further be used as a raw material for preparing fine chemicals such as aromatic compounds using conventional techniques.

The lignin or the composition may be added to surfaces to obtain dust control, or the composition may be used to prepare batteries.

EXAMPLES

In some of the examples below the following lignin types have been used.
Lignin type A1: acid precipitated lignin from black liquor
Lignin type A2: acid precipitated lignin from black liquor dried to 95% dry weight
Lignin type A3: hexyl ester of acid precipitated lignin from black liquor
Lignin type B: filtered black liquor
Lignin type C: lignin chemically reduced using the method according to WO2012/121659

In the examples below the symbol "<" means that not all of the substrate (for example lignin) was dissolved.

Example 1

To a solution of ethyl acetate (0.1044 g) Lignin type A2-Ac-ester (0.1046 g) was added. The suspension was stirred under heating (70° C.). A pourable solution at 70° C. comprising 50 weight % of Lignin type A2-Ac-ester was attained.

Example 2

To a solution of ethanol (0.0858 g) Lignin type A2-Ac-ester (0.1086 g) was added. The suspension was stirred under heating (70° C.). A pourable solution at 70° C. comprising 56 weight % of Lignin type A2-Ac-ester was attained.

Example 3

To a solution of acetone (0.0592 g) Lignin type A2-Ac-ester (0.1012 g) was added. The suspension was stirred under heating (70° C.). A pourable solution at 70° C. comprising 63 weight % of Lignin type A2-Ac-ester was attained.

Example 4

To a solution of polyethylene glycol (0.1372 g) Lignin type A2-Ac-ester (0.0986 g) was added. The suspension was stirred under heating (70° C.). A pourable solution at 70° C. comprising 42 weight % of Lignin type A2-Ac-ester was attained.

Example 5

To a solution of glycerol (1.1634 g) Lignin type A2-Ac-ester (0.1032 g) was added. The suspension was stirred under heating (70° C.). A solution comprising <8 weight % of Lignin type A2-Ac-ester was attained.

Example 6

To a solution of 2-methyltetrahydrofuran (0.0865 g) Lignin type A2-Ac-ester (0.0981 g) was added. The suspension was stirred under heating (70° C.). A pourable solution at 70° C. comprising 53 weight % of Lignin type A2-Ac-ester was attained.

Example 7

To a solution of cyclopentyl methyl ether (0.7775 g) Lignin type A2-Ac-ester (0.1027 g) was added. The suspension was stirred under heating (70° C.). A solution comprising <12 weight % of Lignin type A2-Ac-ester was attained.

Example 8

To a solution of 1,3-propanediol (1.5005 g) Lignin type A2-Ac-ester (0.1063 g) was added. The suspension was stirred under heating (70° C.). A solution comprising <7 weight % of Lignin type A2-Ac-ester was attained.

Example 9

To a solution of 1,3-dioxolane (0.0905 g) Lignin type A2-Ac-ester (0.1043 g) was added. The suspension was stirred under heating (70° C.). A pourable solution at 70° C. comprising 54 weight % of Lignin type A2-Ac-ester was attained.

Example 10

To a solution of dipropylene glycol (0.1142 g) Lignin type A2-Ac-ester (0.1038 g) was added. The suspension was stirred under heating (70° C.). A pourable solution at 70° C. comprising 48 weight % of Lignin type A2-Ac-ester was attained.

Example 11

To a solution of dipropylene glycol (0.1631 g) Lignin type A2-Ac-ester (0.1057 g) was added. The suspension was stirred under heating (70° C.). A pourable solution at 70° C. comprising 39 weight % of Lignin type A2-Ac-ester was attained.

Example 12

To a solution of 1,4-dioxane (0.0772 g) Lignin type A2-Ac-ester (0.0987 g) was added. The suspension was stirred under heating (70° C.). A pourable solution at 70° C. comprising 56 weight % of Lignin type A2-Ac-ester was attained.

Example 13

To a solution of methanol (0.0693 g) Lignin type A2-Ac-ester (0.0986 g) was added. The suspension was stirred under heating (70° C.). A pourable solution at 70° C. comprising 59 weight % of Lignin type A2-Ac-ester was attained.

Example 14

To a solution of isopropanol (0.9031 g) Lignin type A2-Ac-ester (0.1064 g) was added. The suspension was stirred under heating (70° C.). A solution comprising <11 weight % of Lignin type A2-Ac-ester was attained.

Example 15

To a solution of dimethylsulfoxide (0.0995 g) Lignin type A2-Ac-ester (0.1034 g) was added. The suspension was stirred under heating (70° C.). A pourable solution at 70° C. comprising 51 weight % of Lignin type A2-Ac-ester was attained.

Example 16

To a solution of tetrahydrofuran (0.0856 g) Lignin type A2-Ac-ester (0.1063 g) was added. The suspension was stirred under heating (70° C.). A pourable solution at 70° C. comprising 55 weight % of Lignin type A2-Ac-ester was attained.

Example 17

To a solution of pyridine (0.1008 g) Lignin type A2-Ac-ester (0.1080 g) was added. The suspension was stirred under heating (70° C.). A pourable solution at 70° C. comprising 52 weight % of Lignin type A2-Ac-ester was attained.

Example 18

To a solution of acetic acid (0.0887 g) Lignin type A2-Ac-ester (0.0986 g) was added. The suspension was stirred under heating (70° C.). A pourable solution at 70° C. comprising 53 weight % of Lignin type A2-Ac-ester was attained.

Example 19

To a solution of hexanoic acid (1.1881 g) Lignin type A2-Ac-ester (0.1080 g) was added. The suspension was stirred under heating (70° C.). A solution comprising <8 weight % of Lignin type A2-Ac-ester was attained.

Example 20

To a solution of isophorone (0.0835 g) Lignin type A2-Ac-ester (0.1021 g) was added. The suspension was stirred under heating (70° C.). A pourable solution at 70° C. comprising 55 weight % of Lignin type A2-Ac-ester was attained.

Example 21

To a solution of mesityl oxide (0.0670 g) Lignin type A2-Ac-ester (0.1025 g) was added. The suspension was stirred under heating (70° C.). A pourable solution at 70° C. comprising 60 weight % of Lignin type A2-Ac-ester was attained.

Example 22

To a vial containing Lignin type A2 (0.2079 g) 1-methylimidazole (0.020 g), acetic anhydride (0.2046 g), and a mixture comprising free fatty acids (0.2977 g) was added. The suspension was stirred under heating (100° C., 24 h). A pourable solution at 70° C. comprising 28 weight % of Lignin type A2 was attained.

Example 23

To a vial containing Lignin type A2 (0.1932 g) 1-methylimidazole (0.020 g), acetic anhydride (0.2028 g), and a mixture comprising free fatty acids (0.4341 g) was added. The suspension was stirred under heating (100° C., 24 h). A pourable solution at 70° C. comprising 23 weight % of Lignin type A2 was attained.

Example 24

To a suspension comprising free fatty acids and Lignin type C lignin (0.1084 g) acetic anhydride as well as 1-methylimidazole (2 drp) was added. The suspension was stirred under heating (70° C., 1 h). A solution comprising 10 weight % Lignin type C was attained.

Example 25

To a suspension of gas oil and Lignin type C lignin (0.0995 g) acetic anhydride, a mixture comprising free fatty acids as well as 1-methylimidazole (2 drp) was added. The suspension was stirred under heating (70° C., 1 h). A solution comprising 9 weight % Lignin type C was attained.

Example 26

To a solution of gas oil (0.0584 g) Lignin type A2-Myr-ester (0.0195 g) (Myr is a C14 fatty acid) was added. The suspension was stirred under heating (70° C.). A pourable solution at 70° C. comprising 25 weight % of Lignin type A2-Myr-ester was attained.

Example 27

To a solution of hexanoic anhydride (0.9108 g) and 1-methylimidazole (0.0160 g) Lignin type A1 (0.407 g) was added. The suspension was stirred under heating (120° C.) for 2 h forming an esterified lignin. Upon cooling a solution comprising 30.9 weight % of Lignin type A1 was attained. The solution was then dissolved in a mixture of fatty acid derived from biomass in a 1:1 ratio yielding a solution comprising 15 weight % of Lignin type A1.

Example 28

To a solution of hexanoic anhydride (0.4 g) and a mixture comprising fatty acids (0.4 g) derived from biomass, Lignin type A2 (0.4 g) was added, as well as two drops of 1-methylimidazole. The suspension was stirred under heating (120° C.) for 2 h forming an esterified lignin. A pourable solution at 70° C. comprising 33 weight % of Lignin type A2 was attained.

Example 29

To a solution of acetic anhydride (0.2060 g) and a mixture comprising fatty acids (0.2278 g) derived from biomass, the Lignin type A2 (0.2034 g) was added, as well as two drops of 1-methylimidazole. The suspension was stirred under heating (100° C.) for 24 h. A pourable solution at 70° C. comprising 32 weight % of Lignin type A2 was attained.

Example 30

To a solution of hexanoic anhydride (0.2040 g) and a mixture comprising fatty acids (0.2189 g) derived from biomass, Lignin type A2 (0.2007 g) was added, as well as two drops of 1-methylimidazole. The suspension was stirred under heating (100° C.) for 24 h. A pourable solution at 70° C. comprising 32 weight % of Lignin type A2 was attained.

Example 31

To a solution of ethyl acetate (0.1398 g) Lignin type A3 (0.0961 g) was added. The suspension was stirred under heating. A pourable solution at 70° C. comprising 41 weight % of Lignin type A3 was attained.

Example 32

To a solution of acetone (0.0885 g) Lignin type A3 (0.1038 g) was added. The suspension was stirred under heating. A pourable solution at 70° C. comprising 54 weight % of Lignin type A3 was attained.

Example 33

To a solution of polyethylene glycol (1.3309 g) Lignin type A3 (0.1021 g) was added. The suspension was stirred under heating. A pourable solution at 70° C. comprising <7 weight % of Lignin type A3 was attained.

Example 34

To a solution of 2-methyltetrahydrofuran (0.1085 g) Lignin type A3 (0.1013 g) was added. The suspension was stirred under heating. A pourable solution at 70° C. comprising 48 weight % of Lignin type A3 was attained.

Example 34

To a solution of cyclopentyl methylether (0.1124 g) Lignin type A3 (0.0996 g) was added. The suspension was stirred under heating. A pourable solution at 70° C. comprising 47 weight % of Lignin type A3 was attained.

Example 35

To a solution of 1,3-dioxolane (0.0967 g) Lignin type A3 (0.1006 g) was added. The suspension was stirred under heating. A pourable solution at 70° C. comprising 51 weight % of Lignin type A3 was attained.

Example 36

To a solution of furfural (0.1727 g) Lignin type A3 (0.1040 g) was added. The suspension was stirred under heating. A pourable solution at 70° C. comprising 38 weight % of Lignin type A3 was attained.

Example 37

To a solution of dipropylene glycol (0.2092 g) Lignin type A3 (0.1032 g) was added. The suspension was stirred under heating. A pourable solution at 70° C. comprising 33 weight % of Lignin type A3 was attained.

Example 38

To a solution of 1,4-dioxane (0.1260 g) Lignin type A3 (0.0969 g) was added. The suspension was stirred under heating. A pourable solution at 70° C. comprising 43 weight % of Lignin type A3 was attained.

Example 39

To a solution of methanol (0.1022 g) Lignin type A3 (0.1044 g) was added. The suspension was stirred under heating. A pourable solution at 70° C. comprising 51 weight % of Lignin type A3 was attained.

Example 40

To a solution of isopropanol (0.0775 g) Lignin type A3 (0.0955 g) was added. The suspension was stirred under heating. A pourable solution at 70° C. comprising 55 weight % of Lignin type A3 was attained.

Example 41

To a solution of dimethyl sulfoxide (0.2907 g) Lignin type A3 (0.1037 g) was added. The suspension was stirred under heating. A pourable solution at 70° C. comprising 26 weight % of Lignin type A3 was attained.

Example 42

To a solution of tetrahydrofuran (0.1065 g) Lignin type A3 (0.0974 g) was added. The suspension was stirred under heating. A pourable solution at 70° C. comprising 48 weight % of Lignin type A3 was attained.

Example 43

To a solution of pyridine (0.1183 g) Lignin type A3 (0.0993 g) was added. The suspension was stirred under heating. A pourable solution at 70° C. comprising 46 weight % of Lignin type A3 was attained.

Example 44

To a solution of acetic acid (0.1460 g) Lignin type A3 (0.1014 g) was added. The suspension was stirred under heating. A pourable solution at 70° C. comprising 41 weight % of Lignin type A3 was attained.

Example 45

To a solution of hexanoic acid (0.1527 g) Lignin type A3 (0.1040 g) was added. The suspension was stirred under heating. A pourable solution at 70° C. comprising 41 weight % of Lignin type A3 was attained.

Example 46

To a mixture (0.2077 g) mainly comprising fatty acid derived from biomass, Lignin type A3 (0.0927 g) was added.

The suspension was stirred under heating. A pourable solution at 70° C. comprising 31 weight % of Lignin type A3 was attained.

Example 47

Anhydride of Tall Oil Fatty Acids.

To tall oil fatty acids (10.00 g, 1 eq) in dichloromethane (20 ml) was added dicyclohexylcarbodiimide (4.13 g, ca 0.5 eq) in one portion. The reaction was stirred under argon at room temperature for 6 h, followed by addition of pentane (20 ml), filtering and washing the solids with pentane (15 ml). The clear liquids were combined and solvent was evaporated to give 10.66 g of crude anhydride of tall oil fatty acids as thick slightly yellow oil.

Example 48

Acetic Acid Ester.

To a stirred suspension of Lignin type A2 (5.00 g) and acetic anhydride (50 ml) pyridine (50 ml) was added in two portions. The atmosphere was replaced by argon and stirring was continued overnight at room temperature. Solution was cooled in ice bath and cold methanol (150 ml) was added. After evaporating the solvent, the residue was co-evaporated several times with toluene until solid material was obtained. The residue was dissolved in dichloromethane and precipitated with heptane. The clear solution was decanted, the solids were powdered and dried thoroughly in a desiccator under high vacuum over KOH to give 6.89 g of the acetyl ester as brown powder.

Example 49

Lauric Acid Ester.

Lignin type A2 (1.00 g, 1 equivalent), lauric anhydride (4.25 g, 2 eq) and dioxane (10 ml) were stirred under argon and 1-methylimidazole (0.1 ml) was added. The reaction was continued at 80° C. overnight. After cooling to room temperature the liquid was poured into vigorously stirred water (130 ml). The liquid was decanted and the residue was redissolved in tetrahydrofuran and the product was precipitated with water. The decantation and the precipitation were repeated once more. The crude product was dried, redissolved in chloroform and adsorbed on celite (32 g). After thorough drying the solids were stirred with aqueous 0.5 M solution of $NaHCO_3$ (400 ml) overnight under argon. This treatment transformed free carboxylic acid to its corresponding sodium salt having higher affinity to celite than lignin ester. In some cases it was required to add tetrahydrofuran until solids were wetted to ensure faster neutralisation of the free acid.

The celite with adsorbed product was filtered, washed with water and dried under vacuum. The ester was washed off with hexane to give 1.32 g of the lauric acid ester as brown residue after evaporation of the solvent.

Example 50

Caproic Acid Ester.

According to the general procedure of esterification (see Example 49), with modifications, following amounts were used: Lignin type A2 (1.00 g, 1 eq), caproic anhydride (12.8 ml, 2 eq.), 1-methylimidazole (0.44 ml, 0.2 eq.) and dioxane (30 ml). A part of the product was precipitated by pouring into hexane (500 ml) under sonication. The solids were filtered, redissolved in dioxane (10 ml) and poured into hexane (200 ml). The precipitation was repeated once more to give 4.41 g of hexanoic anhydride ester as yellowish powder.

The dark brown supernatants after precipitation were combined, suspended with celite (100 g) and solvent was evaporated thoroughly. To the obtained powder was added aqueous 0.5 M solution of $NaHCO_3$ (800 ml) and the resulting suspension was stirred under argon overnight. After filtering the solids, washing with water and drying under vacuum the remaining ester was washed off with tetrahydrofuran:hexane 1:1 to give 3.26 g of brown residue after evaporation of the solvents. This product was combined with the ester isolated after hexane precipitation, dissolved in 20 ml dioxane and freeze dried to give 7.24 g of hexanoic acid ester as light brown sponge.

Example 51

Cis-3-hexenoic Acid Ester.

Same procedure as for caproic acid ester, except that following amounts were used: Lignin type A2 (1.00 g, 1 eq.), cis-3-hexenoic acid anhydride (2.34 g, 2 eq.), 1-methylimidazole (0.1 ml) and dioxane (10 ml). The precipitation afforded 1.22 g of the ester. Subsequent purification of the precipitation supernatants by celite (20 g) and a solution of $NaHCO_3$ (200 ml) as described in caproic acid ester synthesis afforded 0.2 g of brown residue. Combination of these two fractions of products and freeze drying from 10 ml dioxane afforded 1.4 g of cis-3-hexenoic acid ester as brown solid.

Example 52

Myristic Acid Esters.

Partial substitutions: According to the general procedure of esterification, following amounts were used: Lignin type A2 (1.00 g, 1 eq), myristic anhydride (0.24 or 0.73 g, 0.1 or 0.3 eq), 1-methylimidazole (0.1 ml) and dioxane (5 ml). After the reaction the esters were purified according to procedures below.

Example 53

Purification Procedure of Partially Substituted Esters:

0.1-eq reaction was poured into hexane (50 ml) under sonication. After filtering, the solids were redissolved in dioxane (5 ml) and precipitation was repeated once more to give 1.12 g of the ester as brown powder. 0.3-eq reaction was worked up in the same way to give 1.23 g of the ester as brown powder. Generally 1-3 precipitations were sufficient for all partially substituted esters to give a product free from the carboxylic acid. The presence of free carboxylic acid was monitored using TLC on silica-coated plates using hexane:ethyl acetate:acetic acid as the eluent.

In some cases centrifuge was used to separate solid product.

Example 54

Stearic Acid Esters.

Full substitution: According to the general procedure of esterification, following amounts were used: Lignin type A2 (1.00 g, 1 eq), stearic anhydride (6.12 g, 2 eq), 1-methylimidazole (0.1 ml) and dioxane (15 ml). For purification, celite (50 g) was used with 0.5 M solution of $NaHCO_3$ (400 ml). Some tetrahydrofuran was added to wet the celite. The ester was washed off with neat hexane to give 1.97 g of stearic acid ester as a brown solid.

Partial substitutions: According to the general procedure of esterification, following amounts were used: Lignin type A2 (1.00 g, 1 eq), stearic anhydride (0.31 or 0.92 g, 0.1 or 0.3 eq), 1-methylimidazole (0.1 ml) and dioxane (10 ml). After the reaction the esters were purified according to the general purification of partially substituted esters. 0.1 and 0.3-eq reactions afforded 1.12 g and 1.01 g respectively of the corresponding esters as brown powders.

Example 55

Oleic Acid Esters.

Full substitution: According to the general procedure of esterification, following amounts were used: Lignin type A2 (1.00 g, 1 eq), oleic anhydride (6.08 g, 2 eq), 1-methylimidazole (0.1 ml) and dioxane (10 ml).

The product was purified by dissolving in chloroform and washing with water followed by celite purification. For further purification celite (50 g) was used with 0.5 M solution of $NaHCO_3$ (400 ml). The ester was washed off with neat hexane to give 2.49 g of oleic acid ester as brown thick oil.

Partial substitutions: According to the general procedure of esterification, following amounts were used: Lignin type A2 (1.00 g, 1 eq), oleic anhydride (0.30 or 0.91 g, 0.1 or 0.3 eq), 1-methylimidazole (0.1 ml) and dioxane (10 ml). After the reaction the esters were purified according to the general purification of partially substituted esters. 0.1 and 0.3-eq reactions afforded 1.13 g and 1.18 g respectively of the corresponding esters as brown powders.

Example 56

Behenic Acid Esters.

Full substitution: According to the general procedure of esterification, following amounts were used: Lignin type A2 (1.00 g, 1 eq.), behenic anhydride (7.37 g, 2 eq.), 1-methylimidazole (0.1 ml) and dioxane (20 ml). The product was purified by dissolving in chloroform and washing with water followed by celite purification. For further purification, celite (50 g) was used with 0.5 M solution of $NaHCO_3$ (400 ml). Some tetrahydrofuran was added to wet the celite. The ester was washed off with hexane:tetrahydrofuran 1:1 to give 2.62 g of behenic acid ester as a brown solid.

Partial substitutions: According to the general procedure of esterification, following amounts were used: Lignin (1.00 g, 1 eq), behenic anhydride (0.37 or 1.11 g, 0.1 or 0.3 eq), 1-methylimidazole (0.1 ml) and dioxane (10 ml). After the reaction the esters were purified according to the general purification of partially substituted esters. 0.1 and 0.3-eq reactions afforded 1.15 g and 1.20 g respectively of the corresponding esters as brown powders.

Example 57

Erucic Acid Esters.

Full substitution: According to the general procedure of esterification, following amounts were used: Lignin type A2 (1.00 g, 1 eq.), erucic anhydride (5.49 g, 1.5 eq.), 1-methylimidazole (0.1 ml) and dioxane (15 ml). The product was purified by dissolving in chloroform and washing with water, followed by celite purification. For further purification, celite (50 g) was used with 0.5 M solution of $NaHCO_3$ (400 ml). Some tetrahydrofuran was added to wet the celite.

The ester was washed off with hexane to give 2.57 g of erucic acid ester as brown thick oil.

Partial substitutions: According to the general procedure of esterification, following amounts were used: Lignin type A2 (1.00 g, 1 eq), erucic anhydride (0.37 or 1.10 g, 0.1 or 0.3 eq), 1-methylimidazole (0.1 ml) and dioxane (10 ml). After the reaction the esters were purified according to the general purification of partially substituted esters. 0.1 and 0.3-eq reactions afforded 1.13 g and 1.17 g respectively of the corresponding esters as brown powders.

Example 58

Tall Oil Fatty Acid Ester.

According to the general procedure of esterification, following amounts were used: Lignin type A2 (1.00 g, 1 eq.), anhydride of tall oil fatty acids (5.36 g, ca 2 eq.), 1-methylimidazole (0.1 ml) and dioxane (10 ml). Product was purified by dissolving in chloroform and washing with water. For further purification, celite (50 g) was used with 0.5 M solution of $NaHCO_3$ (400 ml). The ester was washed off with hexane to give 3.91 g of tall oil fatty acid ester as brown thick oil.

Example 59

Solubility of Lignin Esters in Different Carrier Liquids

The solubility was evaluated by adding ~100 mg of lignin or esterified lignin to a HPLC vial followed by the addition of a small amount of solvent or carrier liquid (~3 drops or less). The vial was then put in a shaker at 70° C. and 900 rpm for about 1 h. If the lignin was not dissolved and pourable at 70° C. then more solvent or carrier liquid was added (3 drops or less) and put on shaker for a further 30 min. The final step was repeated until the mixture was pourable at 70° C. or the vial being full. The results are present in FIGS. 2 and 3. The esterified lignins of FIG. 2 have not been purified while the esterified lignin of FIG. 3 have either been precipitated in hexane or purified using Celite.
(EA=ethyl acetate, EtOH=ethanol, MeTHF=methylated tetrahydrofuran, CPME=cyclocpentyl methyl ether, iPrOH=iso-propanol, RTD=tall oil, LGO=light gas oil, CF=membrane filtered lignin, LGTPA=acid precipitated lignin from black liquor dried to 95% dry weight and GM63=lignin chemically reduced using the method according to WO2012/121659)

Example 60

Esterification with $TiO(acac)_2$

Lignin type A2 (0.5 g), oleic acid (1.5 g) and $TiO(acac)_2$ (50 mg, 10 wt %) was added to a round bottom flask in a distillation setup. The mixture was initially heated under stirring to 140° C. overnight. The following night the reaction was continued but with vacuum (>50 mbar) applied and 140° C. The following night the reaction was continued with vacuum but at 180° C. The reaction was followed by GPC, FIG. 4.

Example 61

Esterification with $Fe(acac)_3$

Lignin type A2 (180 mg, 1.00 mmol), oleic acid (894 mg, 3.17 mmol) and $Fe(acac)_3$ (35 mg, 0.10 mmol) was added to a round bottom flask in a distillation setup. The mixture was heated under stirring and vacuum to 180° C. for 30 h. The experiment was repeated and heated under vacuum for 3 days. See FIG. 5.

Example 62

Conversion of the Composition into Diesel Fuel

A composition according to the present invention comprising 100% esterified lignin in RTD and LGO was treated in a hydrotreater. The obtained product remained well into EN590 specifications for road diesel.

Example 63

Scaled Up Preparation

Lignin type A2 was extracted using iso-propanol. The isolated extracted lignin (15 kg) was esterified using oleic acid (64 kg), $Ac_2O$ (Acetic anhydride) (48 kg) and 1-methylimidazole (2.6 kg) according to previously described method. The $Ac_2O$ and imidazole was distilled off and a composition of 19% lignin in oleic acid was obtained.

Example 64

300 g of the esterified lignin of Example 63 was mixed with 200 ml of hot methanol and 300 mg of Dowex 2× and heated over night at 80° C. The excess MeOH (methanol) was evaporated and the rest was dissolved in 300 mL hexane and filtered. Hexane was evaporated and the formulation was analysed according to the rest of carboxylic acids (HMBC).

The esterification of the fatty acid was confirmed using GPC and NMR.

Example 65

300 g of the Lignin type A2 was mixed with 200 ml of hot methanol and 300 mg of Dowex 2× and heated over night at 80° C. The excess MeOH was evaporated and the rest was dissolved in 300 mL hexane and filtered. Hexane was evaporated and the formulation was analysed according to the rest of carboxylic acids (HMBC).

The esterification of the fatty acid was confirmed using GPC and NMR.

Example 66

A mixture of organosolv lignin (28 mg, 1 eq, 0.156 mmol), oleic anhydride (170 mg, 2 eq, 0.311 mmol), dioxane (1 ml) and 1-methylimidazole (1 drop) was heated with stirring at 80° C. under argon for 22 h. The reaction was cooled and solvent removed under vacuum to give 202 mg of organosolv ester as a clear orange-yellow oil. The product was miscible with hexane, LGO and RTD.

Example 67

To acid precipitated lignin from black liquor was dodecylamine added in a 1:1 weight % proportion forming a mixture and heated at 150° C. overnight. A fatty acid epoxide is then added in a 1:1 weight proportion to the mixture and heated again.

The etherification was determined using GPC and NMR.

Example 68

Ether

The general procedure is
  adding Kraft lignin 0.25 g, epoxide 0.25 g to a 25 ml microwave vial
  capping the vial and flush with nitrogen for 10 min
  stir the solution mixture at 150° C. under nitrogen for 14 h
  dissolve with toluene 20 ml and then centrifuge
  dissolve toluene-insoluble material with chloroform and then filter.

Three different etherfications are shown in FIG. 6.

In another etherification: to acid precipitated lignin from black liquor was a primary epoxide (a C16 or C18) added in a 1:2.5 weight % proportion (lignin:epoxide) forming a mixture. An anhydride was then added to the mixture and left to react.

The etherification was determined using GPC and NMR. FIG. 6a-c.

Example 69

Carbamate

Stearic acid was dissolved in DCM and $SOCl_2$ was added, refluxed for 2 hours. Evaporate and co-evaporate with toluene and dissolve again in toluene. $NaN_3$ in water was added and the reaction was stirred overnight. Separate and dry the solvent (toluene) using $MgSO_4$ then reflux under argon for 10 hours. Filter through celite and evaporate to give 110 mg product. HNMR gave that 31% was isocyanate. 30 mg of extracted lignin was added and the reaction heated overnight at 160° C. The product was analyzed using NMR

Example 70

Sorbic acid was dissolved in DCM and $SOCl_2$ was added, stirred overnight at room temperature. The solution was evaporated and co-evaporated with toluene.

Lignin was taken in dry pyridine/dioxane and mixed with acid chloride and stirred at room temperature (rt) overnight.

Fame was added and the open vessel was heated carefully until solvent evaporated, then to 170° C.

Example 71

Imine

A mixture of 1-Dodecylamine (15.00 g) and kraft lignin (15.00 g) was heated at 140° C. for 18 hours. The product was triturated with toluene (75 ml), after centrifugation and decantation the solid residue was triturated 3 times in the same way with fresh toluene (10 ml). The combined toluene extracts were evaporated to give 28.06 g product.

Example 71

Imine

1-Octadecylamine (70.00 g) was melted under argon at 80° C. and lignin (70.00 g) (extracted lignin) was added. The resulting suspension was heated at 190° C. for 22 hours. The product was triturated with toluene (250 ml), after centrifugation and decantation the solid residue was triturated 3 times in the same way with fresh toluene (20 ml). The combined toluene extracts were evaporated to give 128.12 g product. The toluene insoluble residue was dried at 80° C. to give 1.86 g

Example 72

Benzene, alkyl (dimethylsilyl)oxy

Step A

Stearic acid (2 g) was esterified using refluxing MeOH (0.020 L) and DOWEX (H+).

The ester was reduced to the corresponding alcohol by adding NaBH$_4$ (535.3 mg) to the ester and catalytic CeCl$_3$ (26.20 mg) in EtOH (35.21 mL). Stirring at room temperature overnight gave the alcohol in good yield.

(Synthetic communication 2010 page 3423-3429)

Step B

The alcohol was transformed into the corresponding alkyl bromide using the procedure described in:

(J. Label Compd. Radiopharm 2008, 51, 12-18).

Concentrated HBr (45 ml), H2SO4 (3 ml) and stearyl alcohol 4 (0.45 g, 1.7 mmol) were refluxed for 4 h. Water was added and the product extracted with EtOAc (320 ml). The combined extracts were washed with saturated NaHCO$_3$. Evaporation gave 5 as a pale brown powder, which was used in the next step without purification (0.44 g, 79%).

Step C

The bromide was transferred into the alkylchlorosilane using a procedure described in European Journal of Organic Chemistry, 2012, p 1336.

Chlorodimethyl(undec-10-enyl)silane (13): A 100 mL three-necked flask fitted with a reflux condenser, dropping funnel, nitrogen inlet, and magnetic stirring bar was charged with degreased magnesium turnings (0.716 g, 29.4 mmol), dry diethyl ether (10 mL), and a crystal of iodine. The flask was wrapped with a tissue cloth and a solution of 11-bromoundec-1-ene (6.25 g, 26.8 mmol) in dry diethyl ether (15 mL) was added dropwise over 2 h to the rapidly stirring suspension so as to maintain a slight but regular reflux in the condenser. The dropping funnel was rinsed with dry diethyl ether (3 mL) and the resulting mixture was stirred overnight at r.t., to give a mid-brown solution of the Grignard reagent, which contained small amounts of unreacted magnesium and showed 98% GC conversion of the starting bromide. After the solid settled, the clear supernatant and two THF rinses (4 mL) were cannulated under nitrogen into a second 100 mL three-necked flask that contained a rapidly stirring solution of dichlorodimethylsilane (6.9 mL, 57 mmol, 2.1 equiv.) in dry THF (10 mL). The initially clear solution was stirred overnight at r.t. under nitrogen to give a thick white suspension, which was diluted with dry n-hexane (20 mL) and filtered under nitrogen through a mid-porosity glass frit. The residue on the frit was washed with dry n-hexane and the combined filtrates were concentrated with a rotary evaporator. The crude compound was distilled under reduced pressure with a Claisen apparatus to give 13 as a clear, colorless oil (3.30 g, 50%).

Example 73

Scale Up of Lignosulphonate-quaternary Ammonium
1. Add Lignosulfonate (50 g), H$_2$O (125 mL), THF (250 mL) and PTC (200 g) into round bottom flask
2. Heat at 70° C. for 2 hr.
3. Remove the solvents (H$_2$O and THF) by rotary evaporator.
4. Repeat steps 1 to 3 one more time to get a more homogeneous mixture.
5. Add toluene 100 mL and wash crude product with H$_2$O (50 mL)
6. Centrifuge and remove toluene by rotary evaporator.
7. Add hydrotreated light naphthenic (200 g) (22 cSt at 40 degrees) (CAS 64742-53-6), hydrocarbon oil, and toluene (200 mL) and heat at 70° C. for 2 hr.
8. Remove toluene by rotatory evaporator.

The obtained composition was analyzed using NMR and GPC.

The NMR suggests that the final composition comprises almost 5% lignosulphonate.

The weight of lignosulfonate+quaternary ammonium was 223.1. The total weight of lignin, Hydrotreated light naphthenic and hydrocarbon oil was 1,026 g.

Example 74

Lignin was mixed with an aldehyde and Aliquat 336 at 110° C.

The product was analyzed with GPC and NMR.

Example 75

Quaternary Ammonium on Kraft Lignin
1. Add Kraft lignin 95% (50 g), H$_2$O (125 mL), THF (250 mL) and [CH$_3$(CH$_2$)$_{17}$]$_2$N(CH$_3$)$_2$Cl (150 g) into round bottom flask
2. Heat at 60° C. for 2 hr.
3. Remove the solvents (H$_2$O and THF) by rotary evaporator.
4. Add toluene 100 mL and wash crude product with H$_2$O (100 mL)
5. Centrifuge and remove toluene by rotary evaporator.
6. Add Hydrotreated light naphthenic (210 g) (22 cSt at 40 degrees) (CAS 64742-53-6), hydrocarbon oil (630 g) and toluene (200 mL) and heat at 60° C. for 2 hr.
7. Remove toluene by rotatory evaporator The obtained composition was analyzed using NMR and GPC.

The weight of Kraft lining+quaternary ammonium was 192.9 g. The total weight of lignin, Hydrotreated light naphthenic and Medium Petroleum sample A was 1,033 g.

Example 76

Quaternary Ammonium on Kraft Lignin
1. Add lignosulfonate (0.150 g) and Aliquat 336 (0.300 g, [CH$_3$(CH$_2$)$_7$]$_3$NCH$_3$Cl) into a round bottom flask
2. Stir at 50° C. for 5 min
3. Add 1 mL of THF and stir at 50° C. for 5 min
4. Add 1.5 mL of H$_2$O and stir at 50° C. for 5 min
5. Add Hydrotreated light naphthenic (0.300 g) (22 cSt at 40 degrees) (CAS 64742-53-6) and stir at 50° C. for 5 min
6. Remove the solvents (H$_2$O and THF) by rotary evaporator The obtained composition was analyzed using NMR and GPC.

Example 77

Vinyl Ester

Extracted lignin (120 mg) was mixed with vinyl stearate (CAS 111-63-7)(351.33 mg) and heated at 180° C. for 48 hours. No functionalization was observed in the GPC.

Extracted lignin (120 mg) was mixed with vinyl stearate (CAS 111-63-7)(351.33 mg) and DMAP (12.20 mg) and heated at 180° C. for 48 hours. An increase in molecular weight was seen in GPC.

The experiment was also conducted using the following ingredients:
- 80 mg Lignin type A2, 160 mg vinylstearate, 15 mg DMAP 150° C. overnight. Soluble in Hydrotreated light naphthenic.
- 80 mg Lignin type A2, 80 mg vinylstearate, 15 mg DMAP—150° C. overnight. 1:1
- 80 mg Lignin type A2, 160 mg methyloleate, 15 mg DMAP 150° C. overnight. Not soluble in Hydrotreated light naphthenic.
- 4 reactions in the shaker (70° C.): 5 mg DMAP, 30 mg VinylStearate and 10, 15, 30, 40 mg of Lignin type A2. All has low solublitity.
- 80 mg Lignin type A2, 160 mg methylstearate, 15 mg DMAP 150° C. overnight. Not/low solubility in Hydrotreated light naphthenic.

Example 78

Ether and Ester
Preparation of Lignin with Alkyl Containing Groups Via Linkers of Both Ether and Ester.

The reactions were performed according to the esterification and etherification as described above. The etherification was done first except in D.

A. Reagents: 2667 mg of Lignin-FAME epoxide 1:1 (lignin content 37.5 wt %), 1332 mg oleic acid, 68 mg 1-methyl imidazole and 482 mg of acetic anhydride. The obtained functionalized lignin was soluble in LGO (light gas oil).

B. Reagents: 2667 mg of Lignin-FAME epoxide 1:1 (lignin content 37.5 wt %), 548 mg oleic acid, 46 mg 1-methyl imidazole and 227 mg of acetic anhydride. The obtained functionalized lignin was soluble in LGO (light gas oil).

C. Reagents: 500 mg of Lignin Type A2, 392 mg oleic acid, 46 mg 1-methyl-imidazole, 170 mg of acetic anhydride and 296 mg of FAME epoxide. The lignin and the FAME epoxide was first heated at 190° C. for 1 hour and then the oleic acid, anhydride and imidazole was added and the obtained mixture was heated for 2 hours at 170° C. (lignin content 42.2 wt %). Soluble in LGO.

D. Reagents: 500 mg of Lignin Type A2, 304 mg FAME epoxide, 306 mg oleic acid, 23 mg 1-methyl-imidazole, 198 mg acetic anhydride, 1110 mg LGO. Lignin, oleic acid, anhydride and imidazole was first mixed and heated for 2 hours at 190° C. Then FAME epoxide was added and the obtained mixture was heated for 1 hour at 190° C. After the reaction was done LGO was added and some of the product was dissolved.

The functionalized lignin was also analyzed with GPC.

Example 79

Ester
Acetylated lignin type A2 (188 mg) was transesterified with FAME (555 mg) together with 0.14 mg Ti(iPr)$_4$ and isopherone (0.84 ml). The reaction was conducted at 120° C. and 50 mbar vacuum overnight.

The invention claimed is:

1. A composition comprising lignin and a solvent;
   wherein the lignin further comprises at least one alkyl containing group connected to the lignin via an ester; and
   wherein the solvent comprises a carrier liquid that is a mixture of a esterified fatty acid and a hydrocarbon oil, mineral oil, crude oil or bunker fuel.

2. The composition according to claim 1 wherein the solvent further comprises an organic solvent.

3. The composition according to claim 2 wherein the lignin content is at least 1% by weight.

4. The composition according to claim 1 wherein the content of carrier liquid is at least 20% by weight.

5. The composition according to claim 1 wherein the alkyl group in the alkyl containing group is a C7 or longer alkyl group.

6. The composition according to claim 1 wherein the solvent is a mixture of hydrocarbon oil, crude oil, bunker oil or mineral oil and fatty acid or esterified fatty acid.

7. The composition according to claim 2 wherein the organic solvent is a C2-C15 ketone.

8. The composition according to claim 1 wherein the solvent further comprises mesityl oxide, 1,4-dioxane, furfural, acetone, acetophenone, benzaldehyde, isophorone or a combination thereof.

9. The composition according to claim 1 wherein the solvent comprises esterified fatty acid.

10. The composition according to claim 1 wherein the solvent comprises bunker fuel.

11. A method of producing the composition according to claim 1 comprising:
    providing lignin wherein the lignin comprises at least one alkyl containing group connected to the lignin via an ester;
    providing a solvent wherein the solvent comprises a carrier liquid that is a mixture of a esterified fatty acid and a hydrocarbon oil, mineral oil, crude oil or bunker fuel; and
    mixing the lignin with the solvent.

12. A method comprising using the composition according to claim 1 in a hydrotreater or a catalytic cracker to prepare fuel.

13. A method of preparing fuel comprising treating the composition according to claim 1 in a hydrotreater or a catalytic cracker.

14. A fuel obtained by hydrolytical cracking or hydrotreatment of the composition according to claim 1.

15. A fuel additive comprising the composition according to claim 1.

16. A fuel comprising the composition according to claim 1.

17. A method comprising using the composition according to claim 1 in a hydrotreater or a catalytic cracker to produce chemicals or paint.

18. The composition according to claim 5 wherein the alkyl group in the alkyl containing group is C10 or longer.

19. The composition according to claim 7 wherein the organic solvent is a C4-C12 ketone or a C1-C10 aldehyde.

20. The composition according to claim 10 wherein the bunker fuel is Bunker B or Bunker C.

21. The use according to claim 12 wherein the fuel is petrol and diesel, or diesel and petrol analogues, or biogasoline or biodiesel; or fuel additives.

* * * * *